United States Patent
Lazar et al.

(10) Patent No.: US 8,893,760 B2
(45) Date of Patent: Nov. 25, 2014

(54) ACTIVATOR MEANS FOR PRE-APPLIED ADHESIVES

(75) Inventors: John MacKay Lazar, Custer, WI (US); Todd Arlin Schwantes, Lena, WI (US); Frederick Edward Charles Lidington, Custer, WI (US)

(73) Assignee: Appvion, Inc, Appleton, WI (US)

( * ) Notice: Subject to any disclaimer, the term of this patent is extended or adjusted under 35 U.S.C. 154(b) by 170 days.

(21) Appl. No.: 13/236,214

(22) Filed: Sep. 19, 2011

(65) Prior Publication Data

US 2012/0067280 A1  Mar. 22, 2012

Related U.S. Application Data

(63) Continuation of application No. 11/364,645, filed on Feb. 28, 2006, now abandoned, which is a continuation-in-part of application No. 11/216,516, filed on Aug. 31, 2005, now Pat. No. 8,119,214.

(60) Provisional application No. 60/606,720, filed on Sep. 1, 2004, provisional application No. 60/665,134, filed on Mar. 25, 2005, provisional application No. 60/692,009, filed on Jun. 17, 2005.

(51) Int. Cl.
  *B05C 11/02* (2006.01)
  *B01J 13/02* (2006.01)
  *C08J 3/24* (2006.01)

(52) U.S. Cl.
  CPC .. *C08J 3/24* (2013.01); *B01J 13/02* (2013.01); *C08J 3/241* (2013.01)
  USPC ........ 156/578; 156/324.4; 118/103; 118/411; 118/412

(58) Field of Classification Search
  USPC ........ 156/324.4, 578; 425/384, 385; 101/333; 407/29.1, 29.15; 118/313, 323, 411, 118/412, 103
  See application file for complete search history.

(56) References Cited

U.S. PATENT DOCUMENTS

| | | |
|---|---|---|
| 2,984,598 A | 5/1961 | Gobalet |
| 3,340,777 A | 9/1967 | Hittenberger et al. |
| 3,511,138 A | 5/1970 | Baker |
| 3,648,573 A | 3/1972 | LeFebvre et al. |
| 3,754,456 A | 8/1973 | Andrews et al. |
| 4,102,252 A | 7/1978 | Reichert |
| 4,249,978 A | 2/1981 | Baker |
| 4,343,167 A | 8/1982 | Hasegawa et al. |
| 4,490,129 A | 12/1984 | Oakley |
| 5,243,808 A | 9/1993 | Landrum |

(Continued)

FOREIGN PATENT DOCUMENTS

| CH | 380364 A | 7/1964 |
|---|---|---|
| DE | 10106383 A1 | 8/2002 |
| EP | 0014946 A1 | 9/1980 |

OTHER PUBLICATIONS

Cadaco Product Catalog for Bonding Systems, http://www.cadaco.com/productcatalog.html, (Jun. 2005).

*Primary Examiner* — Laura Edwards
(74) *Attorney, Agent, or Firm* — Edward K Welch, II; IP & L Solutions

(57) ABSTRACT

An apparatus for use in activating or re-activating adhesive and sealant compositions that have been pre-applied to a bonding surface prior to mating said bonding surface, said apparatus having a plurality of features for directly acting upon the pre-applied composition.

25 Claims, 10 Drawing Sheets

(56) References Cited

U.S. PATENT DOCUMENTS

| | | |
|---|---|---|
| 5,302,227 A | 4/1994 | Dalrymple et al. |
| 5,562,795 A | 10/1996 | Landrum et al. |
| 5,632,712 A | 5/1997 | Heinz |
| 5,645,361 A | 7/1997 | Mitsushima et al. |
| 5,660,262 A | 8/1997 | Landrum et al. |
| 6,004,417 A * | 12/1999 | Roesch et al. ............. 156/155 |
| 6,113,728 A | 9/2000 | Tsukagoshi et al. |
| 6,726,796 B2 | 4/2004 | Wells et al. |
| 7,204,686 B2 * | 4/2007 | Chung et al. ............. 425/385 |
| 2002/0028599 A1 | 3/2002 | Reeder et al. |
| 2002/0045030 A1 | 4/2002 | Ozin et al. |
| 2002/0101497 A1 | 8/2002 | Kwasny et al. |
| 2002/0134499 A1 | 9/2002 | Wells et al. |
| 2002/0134500 A1 | 9/2002 | Wells et al. |
| 2003/0159608 A1 * | 8/2003 | Heidari ............. 101/494 |
| 2003/0168639 A1 | 9/2003 | Cheon et al. |
| 2003/0168693 A1 * | 9/2003 | Yi et al. ............. 257/316 |
| 2003/0213382 A1 * | 11/2003 | Kendale et al. ............. 101/41 |
| 2004/0051948 A1 | 3/2004 | Reed |
| 2004/0164134 A1 | 8/2004 | Gong et al. |
| 2004/0166257 A1 | 8/2004 | Pierce et al. |
| 2004/0251175 A1 | 12/2004 | Adams et al. |

* cited by examiner

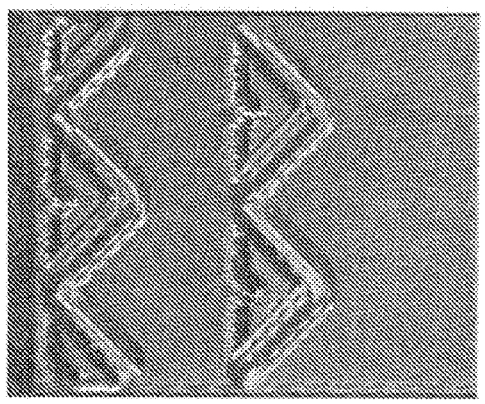 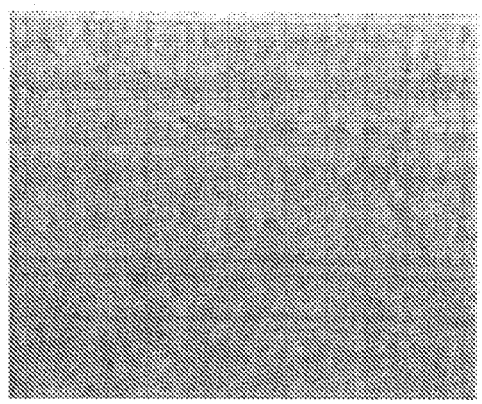
Fig. 13    Fig. 13(a)
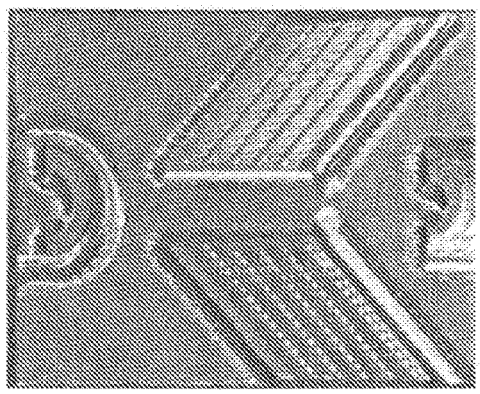
Fig. 14
Fig. 15

ACTIVATOR MEANS FOR PRE-APPLIED ADHESIVES

This application is Continuation of U.S. patent application Ser. No. 11/364,645 filed on Feb. 28, 2006, now abandoned, which is a Continuation-in-Part application of U.S. patent application Ser. No. 11/216,516, filed Aug. 31, 2005, entitled "Encapsulated Cure Systems", now U.S. Pat. No. 8,119,214 B2, which claims the benefit of U.S. Provisional application Nos. 60/606,720, filed Sep. 1, 2004; 60/665,134 filed Mar. 25, 2005 and 60/692,008 filed Jun. 17, 2005: the contents of all of the foregoing hereby incorporated herein by reference in their entirety.

BACKGROUND OF THE INVENTION

1. Field of the Invention

The present invention is directed to a novel activator means for use in activating or re-activating adhesive and sealant compositions that have been pre-applied to a bonding surface or a substrate prior to mating said bonding surface with the surface or substrate to which it is to be bonded. In one embodiment, the activator means is a heated activator means for use with pre-applied heat activated/re-activated adhesive and sealant compositions wherein the heat of the activator means transforms the adhesive or sealant into a flowable state and the features of the activator face of the activator means serve to lift the flowable adhesive or sealant from the substrate surface, collect and then redeposit the same on the substrate surface in the area of the intended bondline in a defined profile. In a second embodiment, the activator means has an activator that is not heated or, if heated, provides minimal heat, and whose activator face has features that are capable of lifting the adhesive from the surface of the substrate to which it is pre-applied, mixing and collecting the pre-applied adhesive material and then re-depositing the same on the substrate surface in the area of the intended bondline. Preferably, the activator means is employed with pre-applied, two-part, curable or polymnerizable adhesive or sealant compositions, especially encapsulated compositions, and has features on the activator face that are capable of intimately mixing the two parts to activate the cure or polymerization of the composition before re-depositing the activated composition on the substrate surface in the area of the intended bondline. The present invention is also directed to industrial bonding systems and apparatus that incorporate said activator means, especially systems and apparatus for high-speed industrial, automated bonding applications as well as bonding methods employing the aforementioned activator means.

2. Description of Related Art

Multi-part adhesive and sealant compositions are widely known and commercially available for both consumer and industrial or commercial use. These compositions are typically characterized as being reactive systems wherein cure or polymerization is initiated once all of the components of the curable composition are brought into intimate contact with one another. By far, the most common multi-part adhesive and sealant compositions are two-part systems. Two-part adhesive and sealant compositions take many forms and can be employed in numerous ways. For example, an adhesive or sealant composition may comprise a first part, Part A, which includes a liquid curable component, and a second part, Part B, which includes an activator in an appropriate solvent, which activator, in the presence of Part A, initiates or effectuates cure or polymerization of the liquid curable component. In use, one or both of the surfaces to be bonded is pretreated or primed with Part B so that when Part A is applied thereto or to the untreated surface, if one, and the surfaces mated, cure or polymerization is initiated.

Alternatively, both Parts A and B may comprise the same or a different liquid curable component with Part A also containing an activator which is, by itself, non-reactive with the liquid curable component of that part, but which is reactive when mixed with Part B. In this instance the activator may be a chemical additive such as an initiator, accelerator, catalyst, etc., which effectuates polymerization or cure but does not itself become chemically incorporated into the cured or polymerized polymer (though it may be physically entrained therein) or it may be a component co-polymerizable with the liquid curable component of Part B, as for example a cross-linking agent or hardener. Of course, not all two-part systems are liquid curable or polymerizable systems. For example, two-part epoxy adhesive and sealant compositions often are found in the form of ribbons, strings, beads, etc. of the two parts in a putty-like state, extruded in a side-by-side or concentric relationship. As with liquid curable or polymerizable systems, cure or hardening is initiated upon intimate mixing of the two components.

In industrial operations, most two-part adhesive and sealant compositions are applied at the time of use: typically through the use of expensive, sophisticated dispensing equipment which meters the relative proportions of the two components and mixes the two concurrent with or just prior to dispensing. Whether mixing occurs within the dispensing equipment or upon exiting the same depends upon the physical nature of the materials as well as their cure characteristics, especially the speed of cure or pot life of the activated materials. Such dispensing equipment is often fed from large containers or reservoirs of the two components or the dispensing equipment may be constructed so as to receive disposable cartridges, including cartridges comprising two chambers, e.g., double barrel cartridges, each of which is constructed to contain a predetermined amount of the two components so that the two materials are dispensed in their proper proportions. The former allows for continuous, or nearly so, dispensing so long as the reservoirs are replenished. However, concerns arise relative to clogging of the dispenser nozzle due to cure of the two-part compositions in the mixer head or at the nozzle orifice, particularly in the event of a shut down or temporary stoppage of the assembly line. The use of the cartridge is especially beneficial in those systems where it is impractical to employ large containers or the containers are unable to be located proximate to the dispenser nozzle. Further, with these systems one has the benefit of being able to dispose of the spent cartridges and avoid concerns of contamination, set-up or cure of the large reservoirs. Furthermore, if a problem arises the unspent cartridge is merely replaced with a new cartridge; whereas, if a problem arises with the large reservoir systems, the reservoirs must be emptied and cleaned and the dispensing system purged before dispensing can be resumed. With cartridges, one also has the possibility of integrating the nozzle or mixer head in the cartridge assembly. Thus, the nozzle or mixer head is replaced with each replacement of the cartridge. If a problem should arise where the nozzle or mixer head is clogged, one merely replaces the whole cartridge system and gets on with the assembly operation. The only loss is the unspent materials in the cartridge and a minimal delay in the assembly line process. Despite the attributes of the cartridge systems, with or without the integrated nozzle or mixer head, the cartridges must be continually replaced due to the relatively low volume of materials held within them as compared to the larger reservoirs of the more sophisticated dispensing equipment. This replacement process results in a repetitive, though temporary, stoppage of the assembly line with its concomitant impact on through put.

Perhaps the greatest disadvantage of the foregoing systems is the use and application of liquid materials in high-speed industrial manufacturing lines. Extreme care must be employed to ensure that the components are mixed in their proper proportions. Even small variations in the proportions by which the two components are dispensed may lead to materials that cure too quickly or too slowly, if at all. Even if cure is unaffected by such variations, such variations will likely result in adhesives having different performance characteristics or physical profiles than would be attained had the dispensing occurred as intended. Furthermore, because these dispensing systems rely upon pressure, direct or indirect, to dispense the components, any variation in pressure may also adversely affect the adhesive and/or bond to be formed. For example, low pressure or the loss of pressure will result in the dispensing of insufficient quantities of adhesive or gaps in the dispensed adhesive leading to poor or failed bonds. Too much pressure or sudden surges in pressure will lead to the dispensing of excessive quantities of material rendering the substrates unsuitable for use or, worse, broadcasting adhesive material not only onto the substrate but onto proximate components of the assembly line itself as well. The latter may lead to a shut down of the assembly line in order to clean it before more, and oftentimes more significant, problems arise.

In order to avoid many of the problems associated with in-line applied liquid adhesive materials, many industrial processes have employed pre-applied adhesives. The vast majority of these systems employ thin films of a dry-to-the-touch thermoplastic (including cooled hot melt) or thermoset adhesive materials that are activated or re-activated, as the case may be, upon exposure to, among others, high temperatures, irradiation (e.g., UV, IR, etc.), electromagnetic fields (e.g., RF, UHF, microwave, etc.) and/or ultrasound. Though such systems have found broad use, they too have limitations, particularly with respect to the bonding of surfaces which are not planar or where gaps may exist. Furthermore, each presents concerns relative to the generation of the necessary energy to activate or re-activate the adhesive, not only with respect to the substrate being acted upon but also the associated equipment proximate to the activation station of the assembly line as well as other general health, safety and environmental concerns, particularly with respect to workers responsible for the operation and maintenance of the assembly line. For example, high-speed packaging formation and closing processes typically employ a pre-applied thermoplastic or thermoset adhesive film applied to the bonding surface which is heated to its activation or melt temperature by one or more heater elements that direct a jet of extremely hot air to the intended bondline.

Although such jets of hot air can be directed, the greater the distance from the source to the substrate, the more diffuse that jet becomes. Also, once the jet hits the substrate, the hot air then disperses along the surface of the substrate. This can be a significant problem with many substrates that have heat sensitive surfaces, coatings and the like. For example, packaging oftentimes has a coating or varnish and/or printing on its outer surface which may be adversely affected by the high temperatures needed to activate or reactive the pre-applied adhesive material, particularly if the heat cannot be contained to the immediate bondline area. Furthermore, workers who are called upon to address problems with the assembly line often come close to or in direct contact with the heating equipment or the heat generated by the equipment, particularly the jets of hot air, which heat may cause severe burns. While safeguards and protective means or design modifications may be incorporated into the assembly line and the heating equipment, such requires additional expenditure and adds more complexity to the system. The same holds true for systems that rely upon electromagnetic energies, ultraviolet light, etc.; rather than the direct application of heat. Finally, such systems are often lengthy, adding further cost, both in terms of equipment and space, to the process in order to allow sufficient cooling of the heated adhesive or sealant before the bond is formed or before sufficient bonding is achieved so that the substrate can move on to its next workstation.

Another class of pre-applied materials are those known as the encapsulated adhesives and sealants. Such encapsulated systems may comprise a one-part adhesive, such as the encapsulated PSAs of Schwantes et. al. (U.S. Pat. No. 6,592,990) or the encapsulated tacky adhesives of Eichel (U.S. Pat. No. 2,986,477), or two- or more part adhesive systems, such as solvent based encapsulated adhesive systems as in Roesch et. al. (U.S. Pat. No. 5,922,798) and Eichel (U.S. Pat. No. 2,907,682) or, more commonly, the liquid curable systems as in Bachmann et. al. (U.S. Pat. No. 3,814,156 and U.S. Pat. No. 3,826,756), Chao (U.S. Pat. No. 6,375,872) and Usami et. al. (U.S. Pat. No. 5,397,812). With the former, crushing the microcapsules makes the encapsulated adhesive available for effectuating a bond. In the latter, crushing the microcapsules merely creates the opportunity for the adhesive to activate or be formed. For example, in the solvent based systems the microcapsules may contain, or one type may contain, a solvent that dissolves or renders tacky an adhesive material that exists in a separate microcapsule, as a particle or as the binder that holds the microcapsule to the surface. When the solvent microcapsule is crushed, the solvent is released so as to 'activate' the adhesive. Alternatively, with the curable systems, cure cannot be initiated or activated until the necessary curatives, whether they be activators, catalysts, initiators or whatever, come in contact with each other and/or the polymerizable components. Crushing the microcapsules allows for all such constituents to come into contact so that cure can be effectuated and the adhesive or sealant formed in-situ.

As mentioned, the more common of the encapsulated adhesives are the two-part liquid curable systems. Like the in-line applied liquid curable systems mentioned previously, these encapsulated adhesives can be custom formulated to fit any number of particular applications/end-uses and/or achieve a multitude of performance properties. Yet, despite their broad properties and performance profiles, these adhesive have found very limited commercial applications. By far, the most common use of these materials is in mechanical fastening applications, either threaded assemblies or in retaining applications. In the former, activation is achieved by the threading action. In the latter, activation is achieved as a result of the assembly of the two parts to be bonded and is most often associated with insertion assemblies. For example, Bonutti (U.S. Pat. No. 4,750,457) employs an encapsulated adhesive in the grooves set in the sidewall of an engine cup plug that is to be inserted into the receiving hole of an engine block. An interference fit deforms the grooves leading to the fracturing of the microcapsules and a flow of the liquid components contained therein. Similarly, Müller et. al, (U.S. Pat. No. 4,100,954) and Mederski (U.S. Pat. No. 5,965,866) employ encapsulated adhesives in the recesses of a body or card wherein the force of inserting a dowel or microchip, respectively, into the recess crushes the microcapsules, thereby initiating cure of the adhesive material.

The use of encapsulated adhesives has also been found with the bonding of rigid flat or planar substrates, albeit in very limited applications. Since activation is initiated by crushing of the microcapsules and the microcapsules themselves are of extremely small diameters, their use, in this regard, is limited to substrates whose bonding surfaces are planar or, if contoured, whose contours mirror image one another so that the two mate together with minimal gap at the bondline or bond interface. If gaps exist which are greater than the diameter of the microcapsules or, depending upon the fragility or rigidity of the capsule walls, even greater than three quarters the diameter of the microcapsules, there may be insufficient release of the curable components so that no or poor bonding occurs. On the other hand, if the mating is perfect and no gap exists whatsoever, then there is concern that all or substantially all of the liquid adhesive material will be squeezed out under the pressure used to crush the microcapsules. Here, remnants of the microcapsule walls help maintain a gap between the mated surfaces to preclude all the adhesive material from being squeezed out under the mating pressure. Even so, a substantial amount of adhesive material may be pressed out of the bondline resulting in poor bond strengths as well as excess adhesive that must be cleaned up.

A growing area of use for encapsulated adhesives is in the bonding of prous or semi-porous, flexible sheet media, especially paper and paper products as well as woven and non-woven fabrics, sheets and web type products. For example, Akridge et. al. (U.S. Pat. No. 5,794,409) and Haugwitz (U.S. Pat. No. 4,961,811) employ encapsulated liquid curable adhesives in the production and/or closure of paper envelopes for letters, junk mail and the like. More recently, Schwantes et. al. (U.S. Pat. No. 6,592,990), employ encapsulated, in-situ formed PSAs for label bonding applications. Activation of the adhesive is typically accomplished by passing the mated surfaces through one or more pinch rollers, under one or more stationary blades, past a set of rotatable discs or a series of sets of rotatable discs, or a combination of the foregoing (See, e.g., Wells et. al., U.S. Pat. No. 6,726,796), which operation fractures the microcapsules and spreads the adhesive between the two mated substrates. Alternatively, at least with the in-situ formed PSAs, the aforementioned activation means may act directly upon the pre-applied adhesive prior to mating the substrates to be bonded.

Despite the success of such systems, these too have limitations, particularly with respect to the encapsulated liquid curable adhesives. For example, due to their low viscosity, liquid curable compositions have a tendency to wick into the porous substrates leaving little curable material in the bond gap or interface to create the bond. This is not as significant a problem with thinner media and very planar surfaces as found with conventional paper envelopes where the liquid materials often saturate the immediate surface layer of the paper, which saturation provides sufficient adhesive material to effectuate the bond. However, more significant concerns and problems are found with thicker media such as paperboard and especially cardboard, where the liquids can be absorbed or wicked deep into the subsurface, leaving little, if any, liquid curable material at the interface, and certainly an insufficient amount to address surface irregularities often found with these materials. On the other hand, some degree of porosity or surface irregularity may be important for those substrates wherein the pre-applied adhesive is to be activated by the use of the aforementioned pinch rollers, blades and rotatable discs; otherwise, if such pores were not present to serve as receptacles for the adhesive, such means would have a tendency to push away, squeeze out or scrape off the adhesive materials leaving little at the bond line or bond interface.

Another factor limiting the use of encapsulated adhesives is the inability to supply sufficient pressure to rupture the microcapsules and/or the poor efficiency with which the capsules are ruptured. Exacerbating the problem is the use of thicker capsule walls as is often found with traditional encapsulated adhesives and sealants in order to avoid premature fracturing. These problems are especially problematic with substrates like paper, cardboard, and the like, especially in thicker sections, that absorb or cushion the pressure that may otherwise be exerted by activation means as described above. Making adjustments to increase the pressure will have the deleterious effect of marring or otherwise deforming the substrates. Substrates that are rigid have a similar problem but for a different reason. Specifically, while the pressure exerted on the rigid substrate passes through to the bond interface, if the substrate surfaces are irregular, there may be gaps at the bond interface where no matter how much pressure is supplied, no fracturing of the microcapsules in the gaps occurs. Thus, again, poor bonding or areas of no bonding may exist.

Though some of the aforementioned problems and concerns are lessened in systems like Wells et. al. wherein a mechanical activator means is seen acting directly upon the encapsulated adhesive materials, such a configuration or process is not typical of nor applicable to the majority of pre-applied encapsulated adhesives. Like conventional activation apparatus and methods, Wells et. al, rely upon compressive forces to fracture the microcapsules; however, since Wells et. al, act directly upon the adhesive, rather than the mated substrates, additional concerns arise and accommodations need to be made to avoid scraping or squeezing all the activated adhesive or sealant off the substrate surface. Here, the angle of the activator means to the substrate surface is very low to enable a mashing of the pre-applied adhesive or sealant as well as allow for the activated adhesive or sealant to pass under the activator means. In any event, the apparatus of Wells et. al. is further limited to those applications which can accommodate or only need a thin film of adhesive for effectuating a bond.

Despite the many attributes of encapsulated curable adhesive systems, particularly with respect to the ability to remove the dispensing of liquid and/or molten adhesives from assembly lines, current technology has not advanced to the point where such may be used across a broad spectrum of substrates and applications. For example, limitations on microencapsulation technology, particularly with respect to the difficulty in, if not inability to, microencapsulate highly viscous materials, effectively restricts the creation of encapsulated adhesives and sealants to those of low viscosity liquid materials. Regardless, perhaps the key shortfall in such technology has been with respect to the activation of encapsulated adhesives. As noted above, most commercial applications rely upon the mating of the substrates to effectuate the bond, either through the rotation or threading action of threaded assemblies or the forced insertion of one element into another in the retaining applications. While rollers, blades and/or rotating discs, as mentioned in Wells et. al. above, facilitate the use of such encapsulated adhesives on certain substrates, their use on rigid and/or non-porous substrates is suspect. Furthermore, because such devices provide only a thin film of adhesive material, they do not allow for their use on non-planar substrates or substrates where gaps may exist, either due to design, poor quality control, or natural flex forces in the materials from which they are made.

Thus, it would be desirable to and there is a need in the industry for a means for activating or re-activating a pre-applied, heat activated thermoset or thermoplastic adhesive or sealant composition which means directly transfers heat to the adhesive or sealant composition without concern for heating, particularly to adversely high temperatures, areas of the bonding substrate outside of the bonding area and which means has minimal heated surface area so as to minimize the possibility that workers in the area or working on the assembly line will be burned or exposed to the high temperatures.

In another respect, it would be desirable to and there is a need in the industry for a means for activating a pre-applied adhesive material that does not require the use of heat, irradiation, ultrasound, electromagnetic energy, etc., for effecting activation or re-activation of the adhesive composition and where, if heat were employed, such heating is merely ancillary to the activation or re-activation of the adhesive and of relatively low temperature and limited duration.

Further, it would be desirable and there is a need in the industry for a means for activating a two-part pre-applied curable or polymerizable adhesive or sealant composition as well as for effectively and efficiently releasing an encapsulated adhesive or sealant composition, which means is simple to employ and cost effective and which is able to do so in other than as a thin film. In particular, it would be desirable and there is a need in the industry for a means for effectively activating a two-part, pre-applied adhesive or sealant composition, most especially an encapsulated liquid curable adhesive or sealant composition, that provides for excellent intermixing of the components thereof, especially those that are of higher viscosity and/or are non-flowing under ambient conditions, as well as a high degree of capsule fracture, where appropriate, while also leaving the activated adhesive on the substrate in a given profile or bead, especially one of a thickness that is of the same thickness as or thicker than the original pre-applied material. In following, it would be desirable and there is a need for such a means that also has the ability to deposit the activated adhesive in a customized bead of a given thickness for the particular end-use application to which it is applied.

Finally, it would be desirable and there is a need in the industry for a bonding method and apparatus which avoids the need to dispense in-line liquid curable or molten adhesive or sealant materials and which provides for high speed bonding applications with minimal capital investment, particularly as compared to current systems for activating pre-applied adhesive and sealant compositions. Furthermore, it would be desirable and there is a need for a high-speed industrial bonding method and apparatus that is able to employ a pre-applied adhesive or sealant composition, particularly one of a thin profile or thickness, and create, in-situ, an activated bead of adhesive or sealant material of a defined profile and/or thickness so as to accommodate the bonding of substrates that do not have planar or mating surfaces, especially those wherein the bonding areas have gaps and/or the whole of the bondline has a gap.

SUMMARY OF THE INVENTION

In accordance with the practice of the present invention there is provided an activator means comprising an activator head having at least one surface or face thereof . . . an activator face, having a plurality of features which features engage and lift a pre-applied adhesive or sealant composition from a substrate, directly or indirectly activate or re-activate said adhesive or sealant composition, and direct the flow or movement of the same so as to redeposit the activated or reactivated adhesive or sealant on the substrate in a defined pattern. The features on the activator face are in the form of projections extending from the surface of the activator face, alone or in combination with one or more recesses or channels. These projections serve to lift the pre-applied adhesive or sealant composition from the surface of the substrate to which it is applied, to disrupt or create shear forces in the flow of the adhesive or sealant composition in the activator means, and/or to direct the flow of said adhesive or sealant composition. The number, shape and size of the projections depend upon the composition of and the pattern of the pre-applied adhesive as well as, in part, the desired pattern or profile of activated adhesive to be left on the substrate following activation. Suitable shapes for the projections include, for example, linear projections such as dams, ridges, herringbones, chevrons, etc. as well as non-linear projections such as hemispheres, hemi-ovals, crosshatches, etc. When dams and ridges or other linear projections are employed, it is preferred that they be aligned at an angle relative to the centerline axis of the activator face to allow for the continuous flow of the adhesive along and past the projections. Though any combination of such projections will provide some degree of activation, it is preferred that the projections include at least two linear projections, especially in a herringbone pattern, or at least one linear projection in combination with one or more other projections. More preferably, the projections will include two or more linear projections, preferably in a herringbone or chevron pattern in combination with one or more other type projections. The use of a plurality of dams and/or ridges alone or in combination with other profiles is particularly beneficial for use with pre-applied two-part curable or polymerizable systems, especially encapsulated systems, as these combinations of features serve to ensure intimate mixing of the components of the adhesive or sealant composition and, where applicable, excellent fracturing of the microcapsules.

Notwithstanding the foregoing, it is also possible that one or more linear projections may be aligned perpendicular to the centerline axis of the activator face provided that either (a) the projection is of sufficiently short length that adhesive accumulated in front of the projection as the substrate advances relative to the activator face is able to flow around and past the ends of the projection or (b) the activator is a reciprocating activator wherein the reciprocation is perpendicular to or essentially perpendicular to the centerline axis so that the reciprocation motion in combination with the relative lateral movement of the activator to the substrate facilitates the flow of the adhesive around and past the ends of the projection. Such projections, however, though possible, are not preferred.

Optionally, the features on the activator face may include one or more recesses which recesses are most often immediately forward the dams or ridges so as to provide a temporary retention, collecting and/or mixing area for the adhesive or sealant composition before exiting the recess. Alternatively or in addition thereto, the recess may be in the form of one or more defined channels in the activator face, posterior to the aforementioned projections, which channels help direct or determine the flow path of the adhesive or sealant as well as provide additional space in which the adhesive or sealant composition collects and mixes. These channels, in combination with the substrate surface, define a die that corresponds to the adhesive pattern and profile to be left on the substrate following activation.

The activator may also have incorporated therein or associated therewith a sensing and motor means which enables the activator face to maintain contact with or at a defined distance from the surface of the substrate upon which it is acting, even if the substrate thickness varies from one article to another or even within a given article. In essence, the sensor will detect changes in the thickness of the substrate or the height of the substrate surface upon which the adhesive lies and relay those readings to a processor which, in turn, activates a motor or lift means that then raises or lowers the activator face, as appropriate. Preferably, the sensor and motor means maintains the activator face in touch contact with the substrate, but without a force that may otherwise result in the activator face marring the substrate surface upon which it acting or cause the activator face to catch the substrate causing a jam or temporary snag in the system.

Depending upon the nature of the adhesive or sealant composition with which the activator means is to be employed, the activator face may incorporate a heating means or be in a heat transfer relationship with a heating means so that the activator may transfer heat to the adhesive or sealant composition in contact therewith. In the case of heat activated or re-activatable adhesive and sealant compositions, the heat to be generated must be high in order to achieve the heat needed for melting or activating the adhesive or sealant composition. In the case of curable or polymerizable adhesive and sealant compositions which do not require the presence of heat to initiate or activate cure, it may be desirable to heat the activator face to a low temperature to facilitate flow of the adhesive and sealant composition through and past the projections and recesses. In both instances the heating element may be incorporated into or comprise a part of the activator means or may be in a heat transfer relationship with the activator means so long as the needed heat energy is provided to the activator face.

The activator of the present invention may be incorporated into any number of existing bonding apparatus in place of current activator means and/or in place of liquid or molten adhesive, especially hot melt adhesive, dispensing means and such apparatus may be readily modified to accept such activator means. In doing so, the activator means may be held in a fixed arrangement so that it does not move relative to the substrate upon which it acts or it may be attached to a robotic arm or like apparatus that controls the movement of the activator means relative to the substrate during the activation process and/or enables the activator means to be retracted from its fixed active position to a stand-by position.

BRIEF DESCRIPTION OF THE DRAWINGS

FIG. 13 is a partial plan view of an activator face having a plurality of rows of inverted "V" dams in a staggered relationship.

FIG. 13(a) is a picture of the adhesive pattern generated by the activator face of FIG. 13.

FIG. 14 is a partial plan view of an activator face having a semicircular dam, a stepped chevron dam and a bead splitter.

FIG. 15 is a partial plan view of an activator face having a plurality of repeating splitter and chevron dams.

DETAILED DESCRIPTION

The present invention is directed to novel activator means for use in activating pre-applied adhesives. The activator means may exist in several different configurations or embodiments depending upon the physical nature, chemical composition and activation methodology associated with the pre-applied adhesive composition. For example, as will be discussed in greater detail below, in one embodiment the activator means may include, or be associated with, in a heat transfer relationship, a heating means that generates sufficient heat to activate or re-activate a pre-applied heat activatable or re-activatable thermoset or thermoplastic adhesive or sealant composition. On the other hand, the activator means may be free of any heating means, either as an integral part thereof or in a heat transfer relationship therewith, or, if heating is desired, the heating means is only capable of generating low temperatures that have the ability to enhance flow of the pre-applied adhesive material past and through the activator face of the activator means but is otherwise insufficient or unnecessary to activate or re-activate the pre-applied adhesive. The activator means may also include or be associated with a reciprocating means and/or vibratory means for providing movement to the activation means relative to the substrate surface upon which it is acting during activation. However, the key element common to the various embodiments of the activator means of the present invention is the presence of an activator face which activator face acts directly upon the pre-applied adhesive or sealant material and includes a plurality of features in the form of projections extending from the surface thereof, alone or in combination and associated with one or more recesses or channels, which features define a flow path for the activated or re-activated adhesive or sealant composition.

Figure 1:
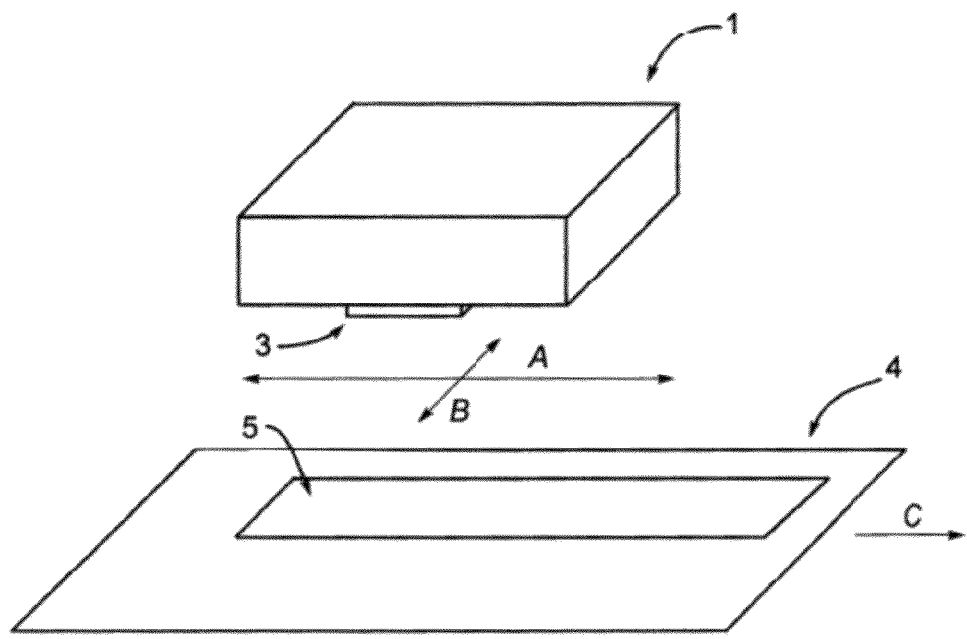
FIG. 1 is a schematic representation of the orientation of the activator means to a substrate during operation.

FIG. 1 provides a schematic representation of the relative orientation of the activator means to a substrate upon which it is it to act. As shown in FIG. 1, the activator means 1 has an activator face 2 (the underside of the means as shown) having one or more projections 3 extending from the surface thereof. The activator means has two axes, a centerline axis A and a transverse axis B. The substrate 4 to be acted upon has a pre-applied adhesive band 5. The pre-applied adhesive band 5 has a centerline axis parallel to the centerline axis A of the activator means. During activation, the relative motion of the substrate to the activator means will be in the direction denoted by the arrow C, along the centerline axis. In certain embodiments, the activator means may also have a reciprocating motion whereby the activator means also moves along the transverse axis B, though such movement will be very small. Where the reciprocating motion is essentially vibrational in nature, the movement along the transverse axis will typically be on the order of nanometers. Where the reciprocating motion is largely responsible for the flow or positioning of the pre-applied adhesive and, where present, the crushing of the microcapsules, the movement along the transverse axis will be on the order of fractions of millimeters to millimeters. In this circumstance, the extent of the movement from one extreme to the other will define the bond width. Consequently, it is preferred that the reciprocation motion be as small as feasible or as needed for the given bond desired.

As discussed in more detail below, reciprocation of the activator means will generally enhance the intermixing of the components of the adhesive or sealant composition; however, reciprocation is particularly important for those activator faces where the projections are aligned in such a manner that gaps exist between the projections when looking down the activator face parallel to the centerline axis. The presence of such gaps means that pre-applied adhesive on a substrate in regions corresponding to the gaps will not be acted upon absent a transverse movement of the activator face, preferably transverse movement in each direction that is at least one-half the width of the gap. Reciprocation of the activator means is also important, if not critical, where the projections are linear or, if aligned in a linear arrangement, non-linear and parallel with or nearly parallel with the centerline axis. Reciprocation may also be important for use with those linear projections that are wide and perpendicular, or nearly perpendicular, to the centerline axis. In this latter respect, reciprocation will assist with the movement of the activated adhesive or sealant past the ends of the linear projection. This is especially important where the projection is nearly as wide or wider than the band of the pre-applied adhesive or sealant upon which it is acting. Those skilled in the art will readily recognize when such reciprocation is needed in light of the teachings contained herein.

Figure 2:
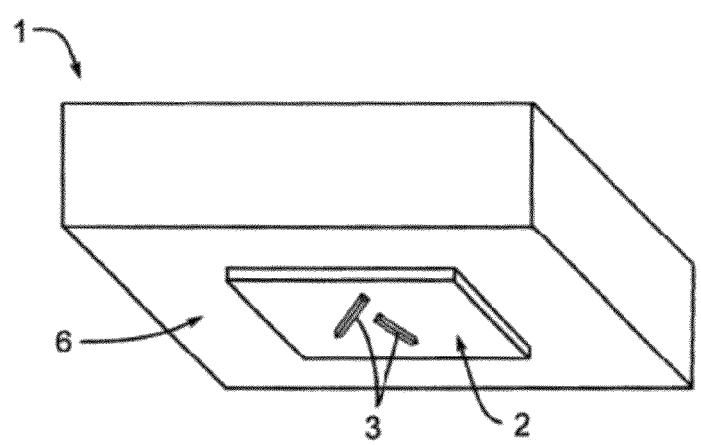
FIG. 2 is a perspective plan view of an activator body having an attached activator face.

As noted, the activator means comprises, at a minimum an activator body and at least one activator face. The activator face may be integral with and form a part of the activator body or, as more clearly shown in FIG. 2, it may be a separate element that is fastened or otherwise bonded to the activator body 6. FIG. 2 shows an activator face 2 having two linear projections 3 in a herringbone relationship.

Although not shown in FIG. 2, the activator body will also comprise one or more attachment means by which the activator body is attached to a larger apparatus or component thereof for the in-line activation of a pre-applied adhesive on a substrate. For example the activator body may be attached, directly or indirectly, to a robotic arm or means that advances and retracts the activator means to and from the active or operational position in an automated bonding process. Alternatively, the activator body may be attached, directly or indirectly, to that part of the frame or superstructure of an automated bonding system and apparatus that is defined as the activation station. In the latter, during use, the activator means would be held substantially stationary while the substrate being acted upon passes the activator face.

As discussed in greater detail below, the activator means may also be mounted upon or have associated therewith a manually operated or motorized lift means, with or without associated sensor means, that allows for an adjustment of (a) the distance or gap between the outer surface or peaks of the features or projections on the activator face and the surface of the substrate upon which it is to act and upon which the pre-applied adhesive lies or, as the case may be, (b) the amount of force of such features on the substrate surface when the two are in a touch relationship. Alternatively or in addition thereto, as discussed above, the activator means may be associated with a reciprocating means which provides reciprocating movement to the activator face which movement is preferably perpendicular to the centerline axis of the activator face.

The activator face and body may be composed of any number of materials, depending upon the specific nature and use of the activator means, and may be the same or different materials. Suitable materials include metals, ceramics, plastics, and carbides, especially metals like aluminum and anodized aluminum. The specific selection of the material depends, in part, upon the particular end-use application for the activator means and the nature of and sensitivity to or reactivity with the adhesive or sealant material to be acted upon. For example, if the activator means is to have heating capability then the activator body and the activator face must be made of a material that has excellent heat resistance and heat transfer characteristics so that the requisite heat is present at the surface of the activator face for transfer to the pre-applied adhesive or sealant material without affecting the integrity or life of the activator means.

On the other hand, if the adhesive or sealant composition is a redox curable adhesive or sealant composition, it may be desirable to avoid certain metals, especially those containing or based on iron or iron compounds, which may cause adhesive or sealant to bond to the activator face. Alternatively, if such metals are employed, then it may be desirable to also coat the activator face with an inert (relative to the curable composition) coating composition to ensure that the metals or metal ions are not available to the curable composition. In essence, the selection of the material comprising the activator head, especially the activator face, should be such that it, either in its virgin state or an aged state, does not adversely interfere with the cure or polymerization of the curable or polymerizable material. In this regard, it is to be understood that interference could be an inhibitory or an acceleration effect on cure.

Another factor to be considered in choosing the composition of the activator face, especially the projections thereon, is the physical nature of the adhesive or sealant composition as well as the abrasiveness of the substrate surface upon which it is to act. In this respect, remnants of the microcapsule walls in the case of pre-applied encapsulated adhesives or inorganic fillers of other adhesives may generate excessive wear on the activator face, especially those made of plastic materials.

Finally, as noted above, the activator face may also have a coating applied thereto. These coatings may serve as a barrier to prevent exposure of the adhesive composition to the composition of the activator face and/or have slip or non-bonding characteristics so that the activated adhesive or sealant flows past and through the activator face without bonding or dogging the same. For example, the coating may be a release type coating such as a silicone material or polytetrafluoroethylene. Typically the coating will be from about 3 to about 6 mils in thickness; however thinner coatings are also suitable.

As previously noted, the activator face may be a part of the activator means or a separate component that is attached thereto, . . . mechanically, chemically or otherwise. Where the activator face is a part of the activator means, the pattern representing the activator face may be machined into that surface of the activator means which serves as the activator face. Alternatively, where the activator means or the body thereof is prepared by a molding operation, the pattern representative of the activator face may be formed concurrent with the molding of the activator means. Where the activator face is a separate component that is attached to the activator body, the activator face, including the features to be incorporated thereon or therein, may be machined out of a stock material or made by a molding process.

The key or critical aspects of the activator means of the present invention are the features on or defining the surface of the activator face. These features are in the form of upwardly extending projections on the surface of the activator face, alone or in combination with one or more recesses or channels that further define the flow path, or a portion thereof, of the adhesive or sealant material through the activator face. Most critical are the projections which engage and lift the pre-applied adhesive or sealant composition from the substrate, directly or indirectly activate or re-activate said adhesive or sealant composition, and direct the flow or movement of the same so as to redeposit the activated or reactivated adhesive or sealant on the substrate. As used herein, the concept of lifting the adhesive or sealant from the substrate refers to the mobilization of the same, though it remains in contact with the substrate surface. Although not critical, as more clearly described below, the addition of channels posterior to the aforementioned projections enables one to then deposit the activated adhesive in a defined pattern and profile.

The projections serve many functions depending upon their shape, size and orientation on the activator face as well as the nature of the pre-applied adhesive. Foremost, as already noted, the projections must lift and/or push the pre-applied adhesive or sealant composition from the surface of the substrate to which it is applied and, in the case of encapsulated adhesives, help fracture the microcapsules to release the contents thereof. Where the adhesive or sealant composition is a curable or polymerizable composition, the activator face will also preferably include projections that alter or disrupt the flow path, thereby creating shear or mixing within the curable or polymerizable composition, and/or, if appropriate, participate in the fracturing or crushing of the microcapsules in the case of encapsulated adhesive or sealant compositions. The activator face may also include one or more projections that serve to collect and deposit the activated adhesive into a single bead or, depending upon the number and shape of such projections, a plurality of beads. In this respect, the projection may also comprise the forward end of a profile channel, as discussed below. Alternatively, the activator face may include one or more projections that divide a single bead into two or more beads. Of course, it is clear that many of these projections serve multiple functions at the same time. For example, the projections that lift and collect the pre-applied adhesive or sealant will most likely also create a flow within the mass of material collected, thereby aiding in the mixing of the same.

Generally speaking, the shape, size, orientation and position of any given projection on an activator face are dependent upon the purpose and function that it is to serve. The height of the features varies depending upon the adhesive, the desired bead of adhesive arising from the activator means, the line speed, the substrate being acted upon, etc. The features of an activator means suitable for use in dosing paperboard containers, such as cereal or cookie boxes, will typically have a height of about 18 mils whereas features twice that height and more may be necessary for sealing a corrugated cardboard container. As discussed in greater detail below, these projections are of three overlapping classes: linear projections, diversionary projections and splitters. Among the shapes such projections may take include, but are not limited to, linear dams and ridges, chevrons, herringbones, "V" shaped or crescent shaped dams or ridges, pyramids, hemispheres, hemispheroids, cylinders, etc. Though a given activator face may have a plurality of identical or like shaped projections, it is preferred that a combination of different shaped projections be employed, particularly where the material to be acted upon is an encapsulated composition. Such variation helps promote good microcapsule fracturing, intimate mixing of the components thereof, as well as good bead formation of the activated material. As will become readily apparent, those skilled in the art and having the benefit of the teachings herein will readily be able to select the appropriate projections and design the proper orientation of those projections to address their particular needs.

Perhaps the most preferred of the projections to be incorporated into or onto the activator face are those that are linear, such as dams and ridges. These linear projections are especially suited for lifting the pre-applied adhesive or sealant from the substrate surface and create flow and mixing of the components as the adhesive passes along the length of the linear projection. When used alone or posterior to other projections, they also serve to collect and direct the flow of the activated adhesive or sealant, preferably creating one or more beads of the activated adhesive. Though the prior art has employed straight edge blades, as noted in Wells et. al. above, the linear edge of the blade is perpendicular to the centerline axis of the adhesive upon which is acts and is angled relative to the surface of the substrate upon which it acts so that the microencapsulated adhesive is crushed and allowed to pass beneath the blade edge. Depending upon the force applied to the blade edge, fracturing may be poor; however, if one increases the pressure to ensure good fracturing, then the adhesive film arising on the posterior side of the blade is thin, most likely much thinner than the original pre-applied adhesive film upon which the blade acted. In essence, activation under the prior art is accomplished by a mashing action that, besides forming thin films of adhesive, limits the degree of mixing of the components of the microcapsules. In Wells et.

al., for example, the mixing of the components is dictated solely by the flow generated by the compressive forces, a flow that is essentially linear extending outward from and forward of the activator element, e.g., the blade or roller. This is in stark contrast to the activator means of the present invention where the various projections create non-linear flow and shear within the mass of materials lifted from the substrate surface Additionally, in contrast to the prior art technology, the linear projections according to the present invention are not aligned perpendicular to the centerline axis or, if one or more is, their length is less than, preferably substantially less than the width of the band of the pre-applied adhesive or, if as wide or nearly so, the activator means has associated therewith reciprocating means so that the ends of the linear dam at each end of the reciprocation motion are within the pre-applied adhesive band and/or the intended bond line. Generally speaking, if such perpendicular linear dams are present in the activators of the present invention, even with reciprocation, they will preferably be very short so as to avoid the build-up of adhesive material on the forward face thereof, which build-up will lead to poor deposits, at least until the amount of build-up exceeds that amount the projection can hold without it spilling past the ends of the projection. Furthermore, such perpendicular linear projections would be employed with one or more non-linear projections and/or one or more angled linear projections. In essence, their primary function would be to lift the pre-applied adhesive from the substrate surface, not smear the adhesive as with the prior art.

Figure 18:
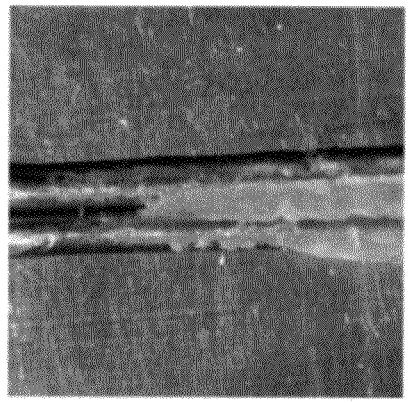
FIG. 18 is a partial plan view of an activator face having a single linear dam parallel to the centerline axis of the activator face.
Figure 18A:
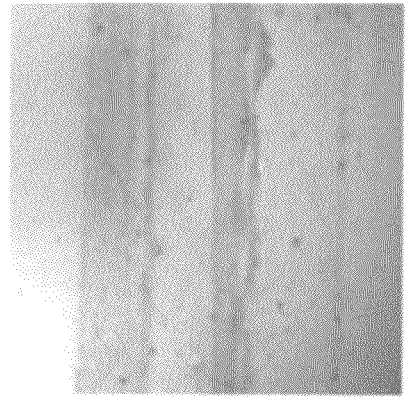
FIG. 18(a) is a picture of the adhesive pattern generated by the activator face of FIG. 18.
Figure 19:
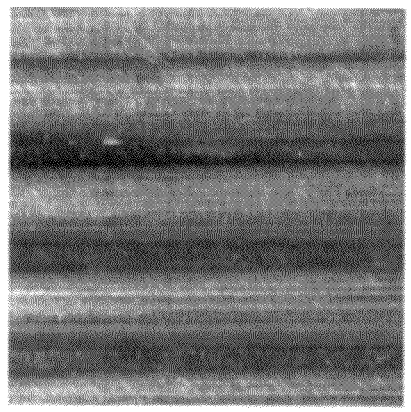
FIG. 19 is a partial plan view of an activator face having a plurality of linear dams parallel to the centerline axis of the activator face.
Figure 19A:
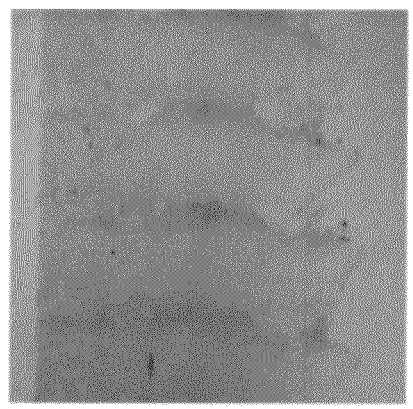
FIG. 19(a) is a picture of the adhesive pattern generated by the activator face of FIG. 19.

Though not preferred, the linear projections may also be aligned parallel to the centerline axis of the activator means. As shown in FIGS. 18 and 19, the activator face may have one or more linear projections; however, in these cases the activator means must reciprocate transverse to the centerline axis so that the linear projections can act upon the pre-applied adhesive band. Otherwise, only that adhesive in the line of contact between the linear projection and the pre-applied adhesive will be activated. The use of such lateral activation creates a bead of adhesive at the end points of the reciprocation motion of each projection. The extent of reciprocation, i.e., the size of the movement of the activator face along the transverse axis, should be sufficient to ensure that the full width of the band of pre-applied adhesive is acted upon or, at a minimum, that the desired width of the intended bondline is achieved. Though, as shown in FIG. 18, a single linear projection could be employed, it is oftentimes preferable to employ a plurality of such projections as shown in FIG. 19. This reduces the extent or length of the reciprocation movement needed and helps ensure that more adhesive is being activated, especially in high-speed automated applications. As shown in FIGS. 18(*a*) and 19(*a*), while the single linear projection creates two parallel beads of activated adhesive, a plurality of equally spaced linear projections will create either X+1 beads or 2X beads, where X represents the number of linear projections, depending upon the extent of the reciprocation movement. Where a plurality of such linear projections is employed, it is preferred that the reciprocation motion be at least such that the furthest movement of a projection in one direction overlaps with the furthest movement of the neighboring projection in the opposite direction, i.e., the reciprocating motion is such that the extreme edges of their paths overlap with those of the neighboring projection. This will generate X+1 beads and allow for a greater build up of the adhesive beads. A shorter movement, i.e., where the paths do not overlap or co-terminate, will typically generate 2X beads of lower a profile: though, depending upon the viscosity of the activated adhesive or sealant, the beads may flow and commingle to form a low profile, wide bead.

Most preferably the linear projections, especially the dams and ridges, will be set at an angle relative to the centerline axis of the activator face. The specific angle of the linear projections will depend upon a number of factors including the adhesive or sealant to be acted upon, particularly taking into consideration its flow characteristics and viscosity, as well as the number and function of the linear projections, etc. Generally speaking, the angles should not be so low that the width of the adhesive band acted upon is too small to generate an adhesive bead of sufficient volume. Conversely, too high an angle, e.g., near or at 90°, and the dam or ridge, particularly with long linear projections, will impede the flow of adhesive leading to a buildup of the same in front of the dam or ridge, which build-up will cause a significant retention time and, in extreme situations, can cause the face of the activator means to rise relative to surface of the packaging substrate upon which is acting. The consequence of this will likely be an uneven and/or irregular bead of activated adhesive, including gaps therein, as well as areas of un-activated pre-applied adhesive. Preferably, the angle of the dams or ridges relative to the centerline of the pre-applied adhesive band will be from about 20° to about 70°, more preferably from about 30° to about 60°, most preferably from about 40° to about 50°

Figure 3:
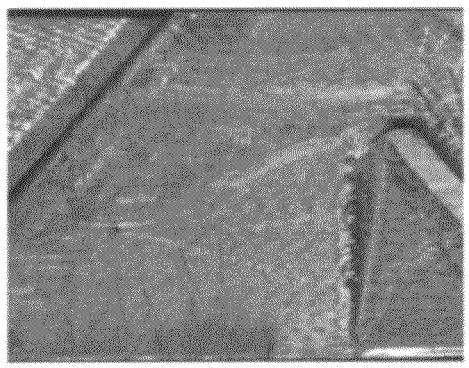
FIG. 3 is a partial plan view of an activator face having two dams in a herringbone pattern.
Figure 4:
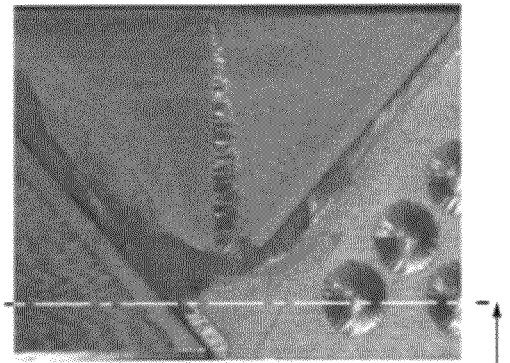
FIG. 4 is a partial plan view of an activator face having two dams in a herringbone pattern and a plurality of hemispherical bumps.
Figure 6:
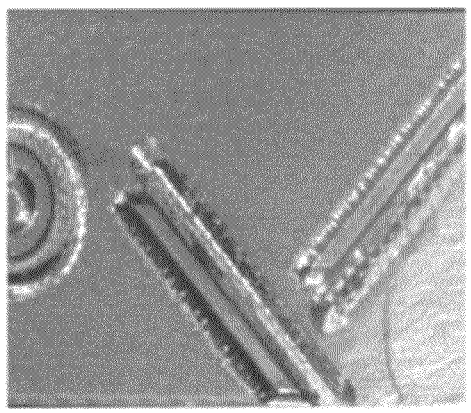
FIG. 6 is a partial plan view of an activator face having two dams in a herringbone pattern and a bead splitter.
Figure 20:
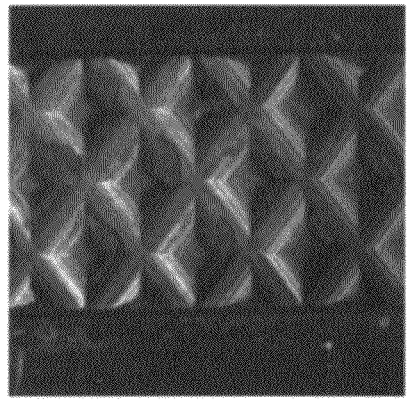
FIG. 20 is a partial plan view of an activator face having a cross-hatch pattern projection.
Figure 21:
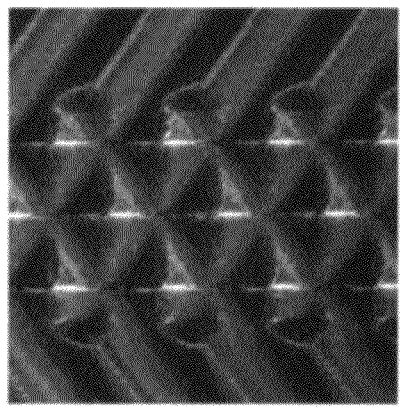
FIG. 21 is a partial plan view of an activator face having a combined crosshatch and chevron pattern projection.

The orientation of the linear projections also plays an important role in the performance and efficacy of the activators of the present invention. Within limitations, as noted above, they may be aligned in any number of different configurations, whether used alone or in combination with other projections. For example, as shown in FIGS. 3, 4 and 6, the linear projections may be aligned in a herringbone configuration where the forward end of the posterior projection overlaps the trailing end of the forward projection. Alternatively, as shown in, for example, FIGS. 7-10, the linear projections may be aligned so as to form a chevron. With this configuration, it is preferred that one or more other projections exist forward of and/or posterior to the gap at the tail end of the chevron. These alignments allow for optimal collection and depositing of one or more, as appropriate, substantially uniform, linear beads of the activated adhesive or sealant. Alternatively, as will be discussed below, one or more raised bands or beads of activated adhesive or sealant may be formed by the selection of certain chevrons in combination with one or more profile channels in the activator face. Other alignments/designs for the linear projections include cross-hatch designs, alone or in combination with chevron patterns, as shown in FIGS. 20 and 21, respectively; inverted "V"s, as shown in FIG. 13; and the like. Finally, one may also employ a plurality of closely laid, stepped chevron dams, each of which is successively higher than the preceding chevron dam. This configuration is shown in FIG. 14 and provides excellent shear and mixing since each successive chevron cuts deeper into the pre-applied adhesive or sealant and creates high shear and mixing forces.

The second type of projections incorporated into or protruding from the activator face are those hereinafter referred to as diversionary projections. These diversionary projections may be of various shapes including, for example, pyramids, hemispheres, hemispheroids, plateaus, etc. These diversionary projections are especially suited for removing the pre-applied adhesive from the substrate surface and for creating disruptions and shear in the flow of the activated adhesive or sealant materials thereby inducing more mixing thereof. When employed with encapsulated adhesives, these diversionary projections also help in fracturing the microcapsules and the release and intermixing of the encapsulated materials.

When employed with encapsulated materials of the type wherein a curative is contained within a viscous, solid or semi-solid carrier material, theses diversionary projections also help knead and mash the carrier material, thereby exposing or rendering available the curative contained therein. Compositions of the latter type are disclosed in co-pending U.S. patent application Ser. No. 11/216,516, filed Aug. 31, 2005, hereinafter Schwantes et. al., which is hereby incorporated in its entirety by reference.

Figure 8:
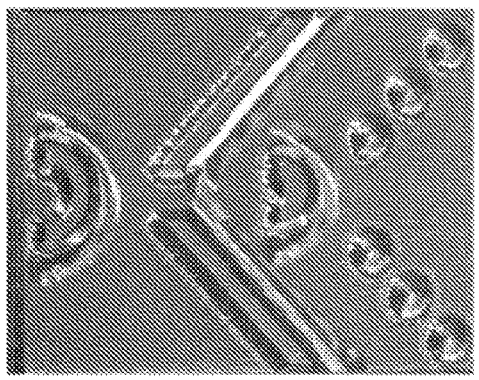
FIG. 8 is a partial plan view of an activator face having a plurality of circular projections, a chevron dam and a bead splitter.
Figure 8A:
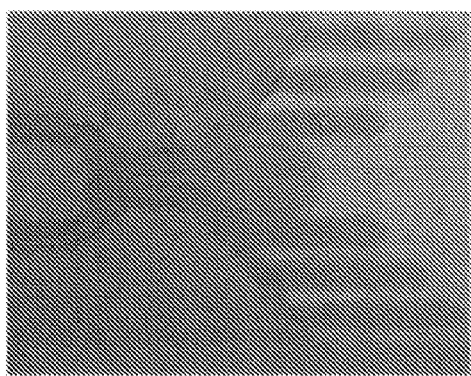
FIG. 8(a) is a picture of the adhesive pattern generated by the activator face of FIG. 8.
Figure 9:
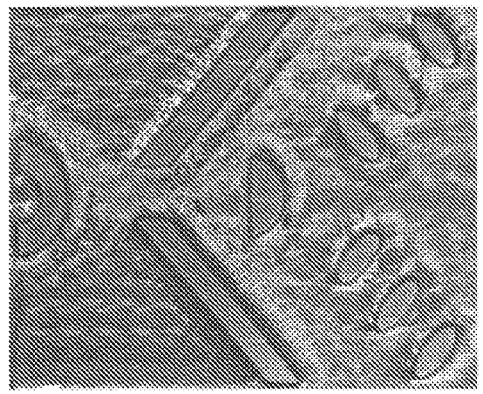
FIG. 9 is a partial plan view of an activator face having a plurality of ovoid projections, a chevron dam and a bead spatter.
Figure 9A:
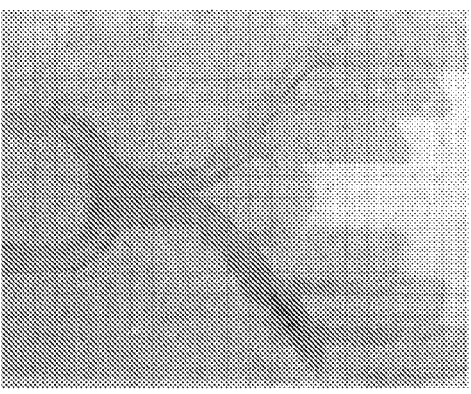
FIG. 9(a) is a picture of the adhesive pattern generated by the activator face of FIG. 9.
Figure 20A:
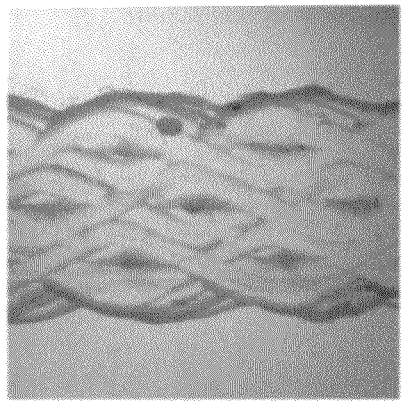
FIG. 20(a) is a picture of the adhesive pattern generated by the activator face of FIG. 20.

Although not necessary, typically and preferably the diversionary projections will be used in combination with at least one linear projection, as shown in FIGS. 4, 8 and 9. In each of these embodiments, the diversionary projections are primarily responsible for mobilizing the pre-applied adhesive and, as appropriate, fracturing the microcapsules, while the trailing linear projections collect and direct the activated adhesive. However, if the linear projections of the embodiments in FIGS. 4, 8 and 9 were removed, the resultant adhesive pattern would be in the form of a plurality of low profile beads or ridges of the activated adhesive. Furthermore, depending upon the alignment of these diversionary projections, one may have the undesired consequence of leaving strips of un-activated adhesive or sealant on the substrate surface. As seen in FIG. 8(a), the lack of staggering and overlap of the paths of the projections of the activator face in FIG. 8 results in strips of un-activated adhesive, shown as light colored strips between the darkened activated areas. On the other hand, as seen in FIG. 9(a), the activation pattern of the activator face of FIG. 9 shows that all the pre-applied adhesive has been acted upon as a result of the overlap of the activation paths. Thus, it is preferred that the diversionary projections be tiered or set in a plurality of rows each of which is off-set relative to the other so that the work areas of the diversionary projections have overlap with one another to ensure that all the pre-applied adhesive is activated. Of course, another means to achieve this goal would be to employ an activator means which has associated therewith a reciprocating means so that the reciprocating motion of the activator face ensures that all the pre-applied adhesive is acted upon. Such motion would also increase the mixing of the adhesive and would provide an adhesive pattern similar to that shown in FIG. 20(a).

As shown in FIGS. 8 and 9, any given activator face may employ a plurality of different shaped diversionary projections. Typically the height of each diversionary projection will be the same, though such is not required. For instance, should different diversionary means have different heights, those that are higher will have a greater role in lifting and/or mobilizing the pre-applied adhesive from the substrate as well as fracturing the microcapsules, if present. On the other hand, those that are of a lower profile will enhance the shear or alteration of the flow of materials and, if applicable, aid in fracturing the microcapsules as well as mashing and kneading the contents thereof.

Figure 6A:
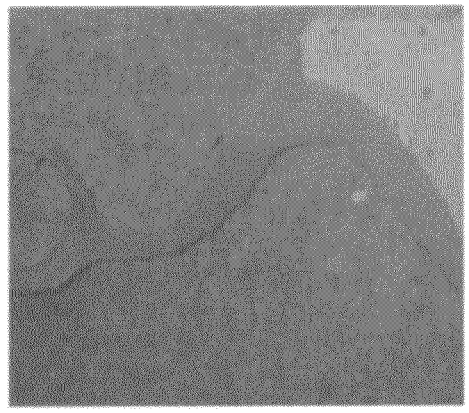
FIG. 6(a) is a photo of the adhesive pattern generated by the activator face of FIG. 6.
Figure 11:
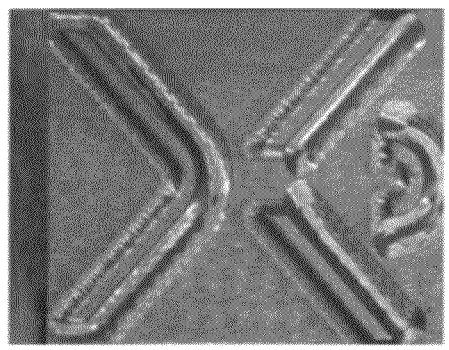
FIG. 11 is a partial plan view of an activator face having semicircular dam, a chevron darn and a wide bead splitter.
Figure 11A:
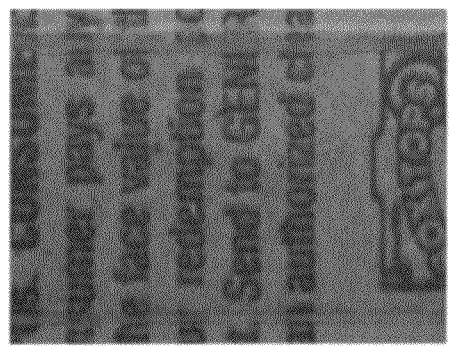
FIG. 11(a) is a picture of the adhesive pattern generated by the activator face of FIG. 11.
Figure 12:
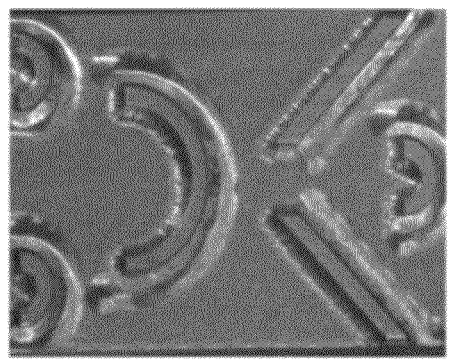
FIG. 12 is a partial plan view of an activator face having semicircular dam, a chevron dam and two series of bead splitters.
Figure 12A:
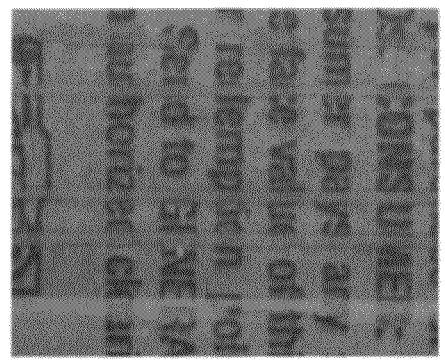
FIG. 12(a) is a picture of the adhesive pattern generated by the activator face of FIG. 12.

The third class of projections, and one that overlaps with the aforementioned classes of projections, especially the linear projections, is characterized as the splitter projections. These splitter projections are typically in the shape of crescents, semicircles, and inverted "V"s and are posterior to either of the aforementioned linear and/or diversionary projections. They serve two key functions: to activate any remaining pre-applied adhesive in its path that has yet to be acted upon and, more importantly, to divide the activated adhesive bead or, if none, the activated adhesive film formed in front of it into two or more beads. Of course, the splitter projections also assist with ensuring fracture of the microcapsules and creating good flow of the adhesive materials for intimate mixing. The width of the splitter projection will determine the spacing between the beads created by that projection. For example the short crescent projection of FIG. 6 produces two closely arranged parallel beads of activated adhesive as shown in FIG. 6(a). In contrast, the wide inverted "V" splitter projection of FIG. 11 produces two widely separated parallel beads of the activated adhesive as shown in FIG. 11(a). Alternatively, as shown in FIGS. 12 and 12(a) and FIGS. 13 and 13(a), one may create a larger number of beads by employing a series of cascading splitter projections so that each of the split beads arising from one splitter projection is subsequently split by a trailing splitter projection.

The combination, number and/or size or length of the projections, especially the linear projections, will also play a role in the efficacy of the activator means. Though more projections and/or longer linear projections, especially, dams or ridges, may increase the efficiency with which the adhesive is lifted from the substrate and increase the degree of mixing of the components before the activated adhesive is re-deposited on the substrate, these factors will also affect the dimensions of the activator face, and thus the activator, and, perhaps more importantly, the retention time of the adhesive or sealant in the activator. In this respect, it is especially desirable to keep the flow path, and thus the retention time, as short as possible: the shortest possible flow path being a straight line which is only achieved with projections that are parallel to the centerline axis and activated by a reciprocation motion. However, since the preferred embodiments of the present invention involve a transverse movement of the adhesive material during activation, said transverse movement, in this respect, being due solely to the shapes, size, number and orientation of the projections, there is inherently a displacement of the adhesive from the point at which it was first acted upon by the activator face to a point further along, though not necessarily on, the centerline axis. The extent of this retention time and, thus, the displacement of the adhesive, will depend upon the complexity of the activator face, especially the length of transverse movement of the adhesive in the activator face, and the viscosity of the materials being acted upon. For example, although the activator face shown in FIG. 15 will provide much more intimate mixing of the adhesive or sealant composition than that provided by the similar activator face shown in FIG. 10, the latter will have a much shorter retention time than that of the latter. Thus, this aspect must be taken into consideration in designing an activator face for a given application. For example, in large applications, e.g., on the flaps of 10 ft$^3$ bulk cardboard boxes, a bead displacement of an inch or more is not critical; however, with small boxes, e.g., a box whose size is on the order of a package of cigarettes, such a displacement is not acceptable: though displacements on the order of a half inch or less could be tolerated.

Alternatively, or in addition thereto, depending upon the nature of the activated adhesive and its affinity for the activator face, the flow path along and past the projections must be primed before the activated adhesive or sealant finally passes the end of the last projection and is deposited on the substrate. In this instance, all or a portion of the pre-applied adhesive from the first substrate to pass through the activation station may remain in the activator means until the next substrate with pre-applied adhesive passes through the activation station whereby the newly collected adhesive material 'pushes' the previously retained activated material through the activator means and onto the substrate. In essence, the adhesive material from the first substrate primes the pump for the next. Here, the retention time is substantially longer as it not only reflects the delay due to the transverse motion of the adhesive material within the activator face but also reflects the time interval between activation on one substrate to the next. This happenstance is important in selecting the appropriate pre-applied adhesive composition in order to avoid premature curing in the activator means.

Another type of feature that may be incorporated into the activator face are recesses which may be in the form of pools and/or channels in and among the projections or profile channels that define an exit path or exhaust for the adhesive from the activator face. In the former, these pools and channels lie below the plane that is defined by the base of the projections and serve as reservoirs and mixing chambers for the adhesive or sealant composition as well as pathways for the flow of the activated adhesive or sealant through and past the projections. Such channels, if present, are shallow so as to minimize their volume; thus, reducing their impact on the retention time.

On the other hand, profile channels that define the exit path for the activated adhesive or sealant are desirable, especially when one is endeavoring to create one or more adhesive or sealant beads of defined geometry or profile. These profile channels act like funnels, collecting the activated material and allowing it to pass through as one or more defined beads. Typically these profile channels will have a chevron or chevron-like shaped forward end that leads into a narrowed pathway extending the remaining length of the activator face. The width of the profile channels and theft depth, i.e., the height of the sidewalls, will define the bead that arises from or is generated by the activator. Initially the depth of the profile channel at the forward end of the channel will be co-planar with the base of the projections; however, as one traverses the length of the profile channel, the depth may increase or decrease depending upon the ultimate bead or beads desired. Increasing the depth of the profile channels, preferably with a narrowing or tapering of the width of the channels, creates raised or high, narrow beads of the activated adhesive or sealant. Alternatively, decreasing the depth of the profile channel, preferably with a broadening of the width of the channel, creates low, broad bead of the activated adhesive or sealant.

Additionally, although the viscosity of the activated adhesive or sealant will affect its stability, the profile channels may also be configured to generate beads of defined profiles or cross-sections. For example, the sidewalls may be angled so that they meet at the point of maximum depth, thereby generating a bead of activated material having a triangular profile. Alternatively, the sidewalls of the profile channels may be rounded so that a rounded bead is generated. In this latter embodiment, the channel looks much like a lengthwise cross-section of a typical funnel. In essence, a cross-section of the profile channel at its tail end, perpendicular to the centerline axis, defines the die from which the activated adhesive or sealant is extruded and, therefore, the beads of the activated adhesive or sealant that results from the given activator. Of course, the viscosity of the activated adhesive will also determine how well and long that profile is maintained following its exit from the activator face. Such may be of little concern in high speed industrial bonding applications since little time exists between the time the substrate exits the activator station and the mating step of the bonding process. Finally, besides affecting the profile or the bead, the viscosity of the activated adhesive in combination with its affinity for the surface of the activator face relative to the substrate surface will also affect the how well the material transverse through and are expelled from the channels. In this latter respect, with low viscosity materials the channel may cause a capillary action whereby activated adhesive is retained in the channel until the next charge and/or the combined forces/interactions may cause a drawdown or stringing of the bead along the surface of the substrate. Alternatively, with high viscosity materials the cohesive strength and resistance to flow of the adhesive materials will also affect retention of the same within the channels and the need for repetitive charging for optimal dispensing or discharging of the activated adhesive from the activator face. Again, with proper selection of the adhesive material, one is able to address these concerns, to the extent they are of concern.

Figure 16:
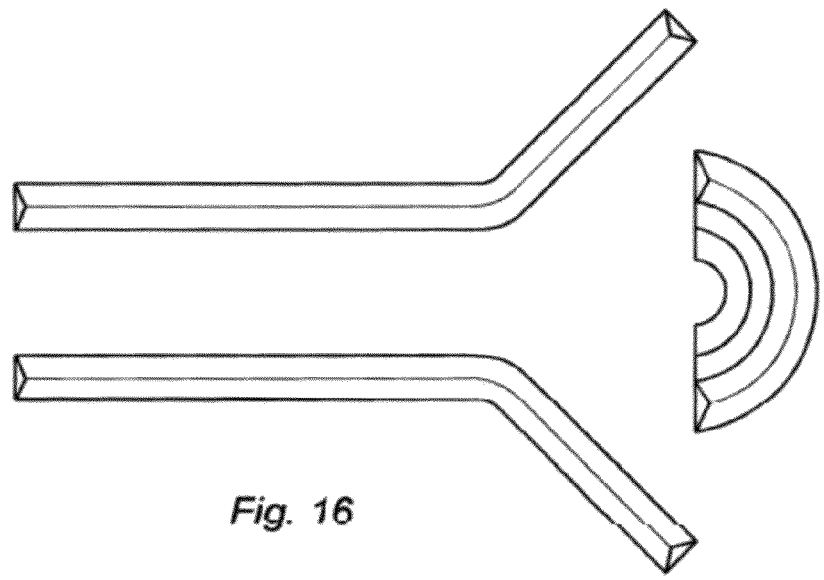
FIG. 16 is a partial plan view of an activator face having a semicircular dam and a chevron dam leading to a broad channel.
Figure 17:
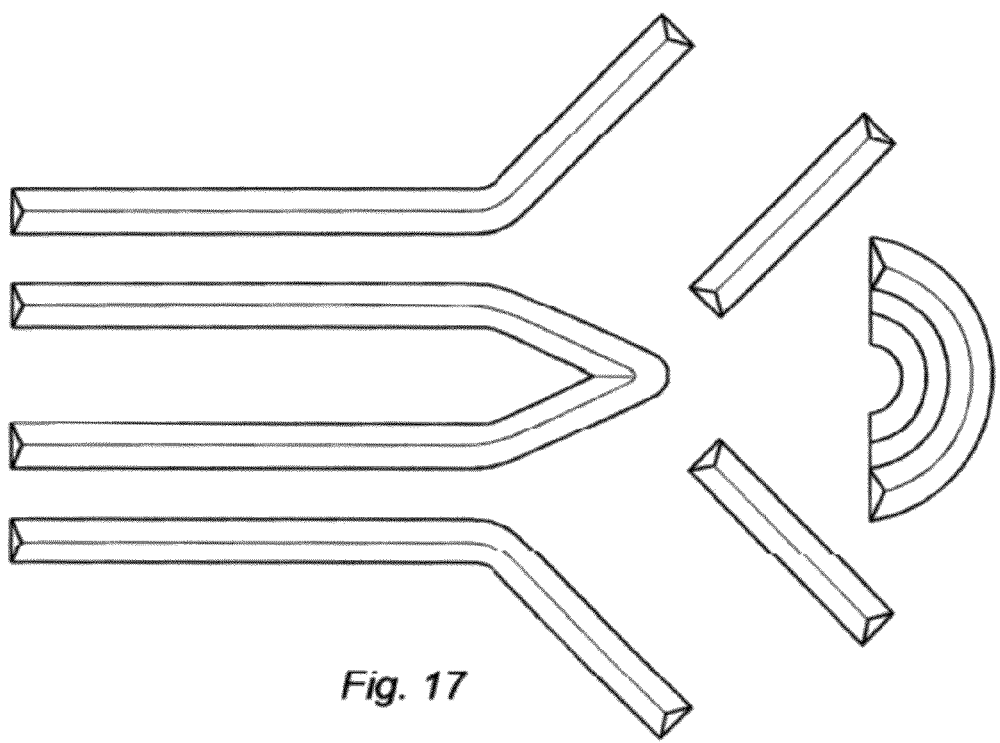
FIG. 17 is a partial plan view of an activator face having a semicircular darn, a chevron darn and a bead splitter leading to two channels.

As noted, a given activator face may incorporate one or more profile channels defining the exit pathway. FIG. 16 shows an activator face having a forward semi-circular or crescent dam followed by profile channel whose entry is in the form of a chevron-type dam that also serves as a linear projection that lifts, collects and moves the adhesive or sealant composition. FIG. 17 depicts an alternate embodiment having two profile channels that are fed by a chevron projection that is preceded by a semi-circular or crescent dam. In this embodiment, the forward end of the common wall of the profile channels acts as a splitter projection, dividing and feeding the adhesive or sealant composition emanating from the chevron into the two profile channels. Although, as shown, the forward end of the channel, e.g., the chevron or chevron-like entrance or collector, may serve as a linear projection, lifting and mixing the adhesive or sealant, it is preferred that such profile channels are employed in combination with one or more of the other projections mentioned above, especially one or more linear projections.

The dimensions of the activator face vary markedly depending upon the volume or rate of application for the pre-applied adhesive to be worked upon; the number, type and complexity of design or pattern of the various features on the activator face; the pattern and profile of the adhesive to exit the activator face; etc.; all of which, in turn, are dependent upon the articles to be activated and the bond or bond area to be formed. Certainly, to optimize the utilization of a pre-applied adhesive or sealant material, the width of active region of the activator face, i.e., that distance along the transverse axis of the activator face from the outermost projection or portion thereof on one side to the outermost projection or portion thereof on the opposite side of the activator face, will be at least as wide as the band or pattern of pre-applied adhesive or sealant material upon which it is to act. In high speed automated bonding lines, since there can be no assurance that the pre-applied adhesive will be in the exact same location from one lot of substrates to the other or that no shifting, even minor, of the substrates occurs on the processing line, the active width of the activator face should be somewhat wider than the band of pre-applied adhesive to be worked upon. Alternatively, one may apply a wider band of adhesive material than is needed to deposit the desired bead to account for such offset and ensure that enough adhesive material is acted upon.

The length of the activator face should be as short as reasonably possible and practical for the given application. In this respect, the dimension will depend upon the physical properties of the adhesive or sealant, once activated, including the cure speed; the type, length, number and complexity of the features on the work face; the speed of the activation means relative to the substrates upon which it acts; the amount of mixing needed to ensure good cure speed and bond strength; the dimensions and location of the pre-applied adhesive and the intended bondline; etc. Generally speaking, by minimizing the length of the transverse flow path, i.e., that distance the materials flow transverse to centerline axis, and the volume or space of the flow path, one can reduce the residence or retention time of the adhesive in the activator face and, consequently, the displacement of the adhesive along the centerline axis. Again, as noted previously, a reduced residence time will coincide with minimal shift and, in the case of curable and thermoset materials, ensure that the composition has not cured or, since cure will have begun, that the degree of cure is not beyond the point where the adhesive is no longer useful for effectuating the bond.

Generally speaking, the dimensions and design of the activator face are dependent upon a number of interrelated factors and parameters. As alluded to previously, the number, type, shape, orientation or alignment, and pattern of the features, especially the projections, to be incorporated into any given activator face depends largely on the chemistry or physical characteristics of the pre-applied adhesive or sealant material upon which it is to act, the volume of pre-applied adhesive, the substrates to be bonded and the bond or bondline desired. Also, as mentioned in the above paragraphs, the dimensions of the activator face are largely dependent upon the number, type, shape, orientation or alignment, and pattern of the features. In essence one needs various features on an activator face in order to activate a given band of pre-applied adhesive of a given chemistry and, in following, one needs adequate space upon which to place the needed features of the activator face to ensure adequate activation and deposition of the activated adhesive or sealant.

For most all applications, the activator face as defined by the peaks of the projections will be essentially planar; however, as noted above, it is possible that one or more projections may have a lower profile or height than others. For example, as explained with respect to FIG. 14, a series of linear projections may be employed that are stepped so that successive profiles strip the pre-applied adhesive or sealant from the substrate one layer at a time. Similarly, one may employ diversionary projections of varying heights to create additional shear and mixing around and under their peaks that may enhance the mashing and kneading of the contents of encapsulated materials. When the activator face includes one or more profile channels the tops of the sidewalls of said profile channels will also be co-planar or substantially co-planar with the peaks of the projections, or at least the highest of said peaks.

Notwithstanding the foregoing, it is also possible for the activator means and, especially the activator face, to be configured to work on non-planar surfaces such as tubular or contoured surfaces. In these instances, the activator face will be contoured so that the contour of its face matches the contour of the substrate upon which it is to act. When reference is made herein to the plane defined by the activator face or the base of the projections thereon, the plane in those instances will be the planar arch defined by the same peaks or bases in their contoured arrangement.

For certain applications it will be necessary to have heat present at the activator face. In those instances, the activator body must include or have incorporated therein a heating means, such as a resistance wire, ultrasonic horn and the like, or be in a heat transfer relationship with a heating means whereby the necessary heat is transferred through the activator body to the activator face. Unlike conventional heaters for pre-applied adhesives, especially the hot air heaters, the heating means in accordance with the present invention are such that the heat generated is localized at the activator face and/or in the activator body. Since the activator face is fairly small and the sides of the activator face and activator body can be encased or insulated, concern for accidental burning of workers and the like are avoided. Furthermore, since only the activator face comes in contact with the substrate surface, any potential for impact of the heat on the substrate is limited to the bondline. And, in high-speed processing lines, since the time of contact between the substrate and the activator face is so small, there is little if any chance that any substantial amount of heat will actually transfer from the one to the other. In essence, all or substantially all heat transfer will be between the activator face and the adhesive material, with little, if any, heat transfer to the substrate. Furthermore, since the contact time of the adhesive with the activator face is so small, especially in high speed automated applications, there is little if any heat transfer to the adhesive, except, perhaps, to the monolayer of adhesive material at the adhesive/activator face interface.

The activator means of the present invention may also have incorporated therein or be in a motion transfer relationship with a reciprocating, oscillating or vibration means which imparts movement to the activator face. Such means are well known it the art and will comprise, for example, an electric or pneumatic motor with an associated cam. As noted above, activator faces wherein the projections are parallel with or substantially parallel with the centerline axis or, in the case of long linear projections, perpendicular to the centerline axis, the extent of the motion of the reciprocating means will generally be on the order of one millimeter or more, preferably several millimeters. In most all other applications, the movement to be imparted to the activator face is minimal, preferably one millimeter or less, most preferably less than one-half millimeter. Indeed, for many applications, movement on the order of nanometers is sufficient as the primary goal of such motion is to increase the mixing of the adhesive or sealant composition, including, as appropriate, the mashing and kneading of any microcapsules and their contents.

Additionally, the activator means will preferably incorporate or be associated with an adjustment means which allows the operator to set the initial relationship, whether a gap or zero gap, with or without a predetermined compressive force, between the activator face and the substrate surface upon which it is to act. Most preferably the adjustment means will accommodate both manual and automatic adjustments so that the initial or desired height may be set and then the system automatically makes adjustments to accommodate changes in the height or thickness of the substrates upon which it is acting, especially during operation of a fully automated assembly process. Suitable adjustment means may be simple in design and construction. For example, the means may comprise a tension means e.g., springs, which maintains a constant or near constant force on the activator means so as to maintain pressure contact with the substrate wherein the tension or force is sufficient so that the uppermost surface of the projections maintains contact with the substrate surface even as the activator face lifts the pre-applied adhesive or sealant material from the substrate surface, i.e., the tension is preferably sufficient so that the activator face does not ride above the pre-applied adhesive or the mass of adhesive built up in front of the projections. Such tension means will also allow for an adjustment of the activator means so as to accommodate variations in the thickness of the substrate or sequential substrates as they pass through the activator means.

Alternatively, the adjustment means may be complex and involve more sophisticated mechanical and/or intricate electronic systems that include a sensing means which identifies variations in the height or thickness of the substrate as it enters the activator means and adjustment means, responsive to the sensing means, that automatically adjusts the height of the activator face to accommodate such variations so as to maintain the desired relationship between the activator face and the substrate surface. Such systems will accommodate and make adjustments for thickness variations even on the order of microns.

As noted above, during operation of the activator means there may be a gap between the activator face and the substrate surface upon which it is acting provided that the gap is less than, preferably no more than one-half, most preferably no more than one-third, the height or thickness of the pre-applied adhesive or sealant on the substrate. Otherwise, the amount of adhesive or sealant activated will likely be insufficient to effectuate a suitable bond or seal. The concern with gaps is even more troublesome in the case of encapsulated adhesives and sealants since gaps exceeding about one-half the average particle size of the microcapsules will lead to poor and insufficient fracturing of the encapsulated components and, consequently, insufficient cure and/or adhesive materials to effectuate a suitable bond or seal. Furthermore, with compositions like those of Schwantes et, al, such gaps may result insufficient microcapsule fracture, but insufficient kneading of the carrier to release or make available sufficient curative to effectuate a suitable bond or seal.

In the preferred set-up for use of the activator means of the present invention, there will be no gap between the activator face and the substrate surface. Though not required, it is also desired that the activator body be set so that an interference exists between the features of the upper surface of the activator face and the substrate surface upon which it acts. For solid surfaces, the interference will be negligible or only a touch interference: most preferably, the activator means will be set to a depth of from about 0.1 to about 0.5 mils below the substrate surface, preferably from about 0.1 to about 0.3 mils below the surface. However, for softer surfaces, like paperboard, cardboard and the like, a greater interference is desired. Here the activator body will be set so that the upper surface of the features of the activator face will be about 10 mils or less below the surface of the substrate, preferably about 5 mils or less below the surface of the substrate. Though the interference is not required, it is preferred that the interference be at least about 0.1 mil, most preferably 0.3 mils, on softer surfaces. Maintaining a low degree of interference minimizes any marring or scoring of the substrate surface while endeavoring to ensure that all of the pre-applied adhesive or sealant is lifted from the substrate surface. This will also help ensure that the activator face will not rise relative to the substrate surface due to a build-up of adhesive or sealant materials on the forward face of the features on the activator face. Such a configuration helps maximize the amount of activated adhesive or sealant available to form the bond or seal as well as provide a 'clean' surface for good wet out of the adhesive directly on the substrate surface. Furthermore, this setup minimizes and/or accommodates for any tendency of the activator face to rise relative to the substrate surface during operation, i.e., the happenstance of the activator face hydroplaning on the activated adhesive materials. If a gap exists or the force is insufficient to guard against the activator face rising relative to the substrate surface during operation, a thin film of the pre-applied adhesive or sealant will remain and the activated adhesive or sealant will then bond to that film rather than the substrate surface itself. At the same time, as noted above, it is preferable to minimize the extent to which the activator face is set below the surface of the substrate, thus the compressive force between the activator face and the substrate surface, so as to avoid or minimize the likelihood of a projection or other feature on the activator face catching on any surface irregularities or imperfections on the substrate surface or of such projections marring the substrate surface as well as to avoid or minimize the likelihood that compressive force will interfere with the substrates, impeding their progression through the activator means or causing the substrates to become misaligned. The latter will adversely affect the through-put rate and, potentially, the quality of the product formed; whereas the former, especially in high speed automated operations, may have significant and disastrous consequences including, for example a complete shutdown of the production line in which it is integrated. Thus, in general, a light touch contact is most preferred.

Figure 7:
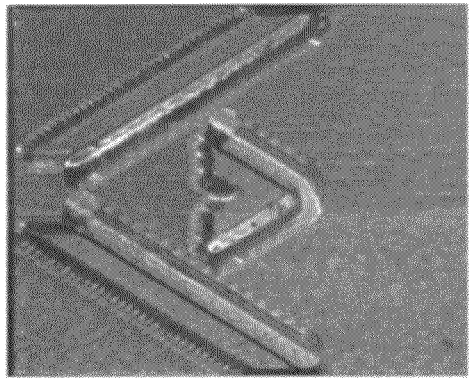
FIG. 7 is a partial plan view of an activator face having a front inverted "V" dam and two trailing linear dams in a chevron pattern.
Figure 7A:
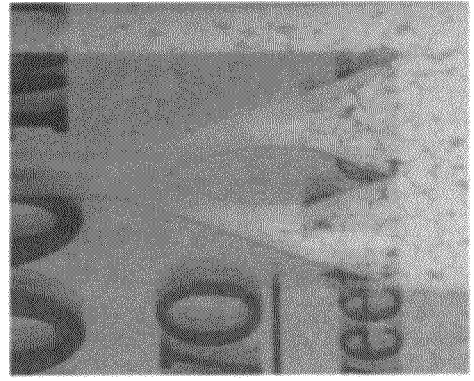
FIG. 7(a) is a picture of the adhesive pattern generated by the activator face of FIG. 7.
Figure 5:
FIG. 5 is a cross-section of the activator face of FIG. 4 taken along line 4-4.
Figure 10:
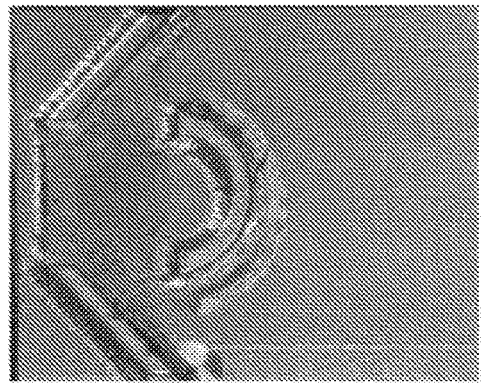
FIG. 10 is a partial plan view of an activator face having a front semicircular dam and a wide mouth chevron dam.

As noted above, the type, chemistry and dimensions of the pre-applied adhesive or sealant to be acted upon are, at least in part, determinative of the selection and positioning or alignment of the projections on the activator face as well as the other features or capabilities of the activator means. For example, a pre-applied heat activated/re-activatable thermoset or thermoplastic material has very simple needs relative to the activator face: the presence of a heat source in or in a heat transfer relationship with the activator face and a single linear projection, e.g., one that looks and performs much like a snowplow. If one wanted a plurality of beads for forming the bond, one could employ an inverted "V" shaped projection. However, if the band of the pre-applied adhesive or sealant is wide, particularly if the heated adhesive or sealant is still quite viscous, a single linear projection may not be suitable. Here, the combined length of the linear projection and the poor flow of the viscous material would create a circumstance where a significant retention time exists before a sufficient bead of activated material exists the end of the linear projection. Thus, it is preferable to employ a plurality of shorter linear projections, most preferably either in a herringbone arrangement, as seen in FIG. 3, or as a chevron. As seen in FIGS. 7, 7(a), and 10, the chevron configuration will typically have a forward linear or diversionary projection to ensure that the gap defined by the trailing ends of the chevron is activated. Both configurations have the benefit of collecting the activated adhesive or sealant into a larger mass that then exits the activator face. The herringbone configuration produces a single raised bead whereas the chevron will produce two beads or, if the gap is small enough, a single, broad bead of the activated adhesive. These raised beads provide excellent bonding capabilities and expand the number and variety of applications into to which such pre-applied thermoplastic and thermoset adhesive can be employed. Indeed, raised beads of activated adhesive allow for the use of this technology on non-planar surfaces, on more porous surfaces, and the like.

Pre-applied encapsulated curable adhesives and sealants, on the other hand, present a somewhat more difficult circumstance since the microcapsules must be fractured with high efficiency and the contents thereof intermixed to ensure good and/or efficient cure. The former is of utmost concern with encapsulated materials having thick capsule walls and/or small particle size microcapsules. The latter is of utmost concern with those compositions, including the aforementioned Schwantes et, al. compositions, wherein mere fracturing of the microcapsules fails to release or make available all of the encapsulated components and/or a sufficient amount of the critical components otherwise necessary to initiate full or even satisfactory cure. Consequently, activator faces for use with curable adhesive and sealant compositions will typically have more complexity, which complexity is most often embodied in the use of a plurality of projections and, most preferably, a combination of different types of such projections. Such variation will help ensure good mobilization of the adhesive or sealant, highly efficient microcapsule fracture and increased shear or mixing of the adhesive or sealant components. Most preferably, such configurations will include a plurality of linear projections or one or more linear projections in combination with one or more diversionary and/or splitter projections.

Depending upon the nature of the microcapsules and/or their contents, it may also be preferable, if not necessary, to heat the activator face for optimal performance of the activator means. Though the curable compositions are preferably non-heat activated, as also disclosed in Schwantes et. al., certain carrier materials, e.g., low melting waxes and the like, may require elevated temperatures in order to make the curative contained therein accessible to the other constituents of the curable compositions. Furthermore, it has been found that low levels of heat, generally 400° F. or less, preferably from about 175° F. to about 350° F., most preferably from about 200° F. to about 250° F., help the flow of the activated material along the activator face and through and past the projections. Of course, the actual or preferred temperature will depend upon the adhesive materials used and can be determined by simple trial and error. Though the exact mechanism is not known, it is thought that the heat creates a lower viscosity film at the adhesive/activator face interface: similar in concept to the creation of the water film between the ice and a blade of an ice skate. As in the skate example, because the contact time is so short, the heat transfer is limited to the molecular interface and no heating of the bulk of the adhesive or sealant is seen.

Figure 21A:
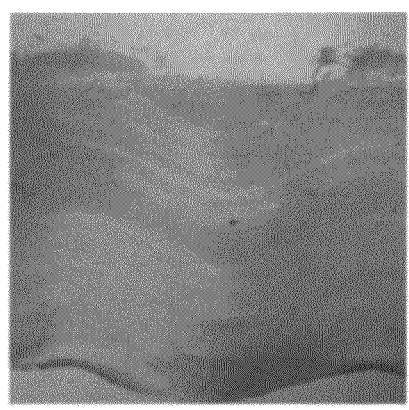
FIG. 21(a) is a picture of the adhesive pattern generated by the activator face of FIG. 21.

Regardless of which adhesive or sealant chemistry or type is present, when the band or pattern of the pre-applied material to be acted upon is extremely wide, e.g., more than three quarters of an inch wide, it may be desirable to employ a plurality of linear projections, e.g., herringbone or chevron projections, in a side-by-side relationship, extending across the full width of the pre-applied adhesive band. Such an arrangement, although employing side-by-side inverted "V" linear projections in combination with a plurality of side-by-side inverted "V" splitter projections, is shown in FIG. 13. This configuration results in the generation of plurality of parallel beads of the activated composition, as shown in FIG. 13(a), and minimizes the length of the activator face that would otherwise be necessary for activating the wide band of adhesive. Alternatively, the activator face could have a plurality of diversionary projections extending across the full width of the band of pre-applied adhesive or sealant, preferably in a staggered orientation, so that the whole of the pre-applied adhesive is acted upon. Such an activator face would provide a series of parallel furrows with raised edges, similar to the pattern generated by drawing one's fingers through the top inch or so of sand at the beach. Adding reciprocating motion to this activator face will create a ribbon-like pattern of a series of parallel furrows with raised edges or a braided like pattern of the furrows, similar to the patterns shown in FIGS. 20(a) and 21(a), respectively, depending upon the spacing and number of rows of the projections. The reciprocating motion will also help ensure intimate mixing of the components of the adhesive or sealant compositions should such be needed.

Activation of the pre-applied adhesive may be accomplished manually using a hand-held device that incorporates the activator body and activator face or, preferably, automatically using automated machinery that holds or incorporates the activator body and activator face. Though there is a large zone of overlap in terms of when each may be used, in the case of curable encapsulated adhesives and sealants, where the cure speed of the activated curable composition is very fast, on the order a second or less, in-line automated activation and assembly will be needed. Slow cure speeds, e.g., where there is a long open time, are especially beneficial in manual operations and when the activator means is a stand-alone apparatus or where the subsequent assembly step is a manual step as opposed to an automated step or where in an automated system, the activator means must be retracted from the activation site before the surfaces to be bonded may be mated.

In the preferred embodiment, activation of the pre-applied adhesive will be achieved through an automated activator means, either as a stand alone apparatus or machinery that merely activates the pre-applied adhesive or as an in-line activator means that is integrated into a larger industrial assembly or manufacturing apparatus. In either situation, the activator means may be stationary or attached to or part of a robotic arm or like apparatus. In the latter situation, which is especially suited to allow for its use with substrates of non-planar shapes or which have odd shapes whereby an unobstructed path for the activator means is not present as the substrate passes the activator means. In this case the activator means is capable of movement from an active mode where it is in-line in the activation workstation and an idle mode where it is off-line and retracted from the actual working site of the activation work station. Alternatively, there may be situations in which the centerline of the adhesive bead is perpendicular to the assembly line. In such situations, the activator means, during the activation step, is not stationary relative to the assembly line apparatus but moves such that the activator passes over or swipes across those sections of the substrate upon which the pre-applied adhesive lies, either in a continuous or discontinuous fashion. In either respect, these apparatus are directly integrated into the assembly line and, for existing lines, can replace those workstations that previously applied a liquid or flowable adhesive and, if present, cured the same or, where appropriate, the heating stations employed with conventional pre-applied heat activated adhesives.

An especially preferred embodiment of the present invention is that where the substrate to be acted upon is flat or is such that it allows for a stationary activator means to act upon the pre-applied adhesive as the substrate passes through the activator workstation. In these instances, the process is a continuous one whose speed or level of output is only limited by the speed or output of the remaining steps of the assembly or manufacturing process. In essence, the present invention provides processes where the adhesive application and/or bonding steps are no longer the bottlenecks.

As disclosed in U.S. Provisional Patent Application Nos. 60/665,134 filed Mar. 25, 2005 and 60/692,008 filed Jun. 1, 2005, both of which are hereby incorporated herein by reference, the present invention is especially suited for use with stock materials, most especially stock packaging materials or blanks, having a pre-applied adhesive or sealant. Due to the planar nature of such stock packaging materials, or at least the flaps or portions thereof upon which the adhesive is pre-applied, these substrates are especially suited for high speed industrial package forming and/or closing operations. Indeed, it is found that automated package formation processes employing stock materials in the form of paperboard blanks may achieve rates of up to 300 feet per minute and higher when being activated by an activation means in accordance with the present invention. Even with less than optimal activation, rates of up to 250 feet per minute or more can be successfully attained. Such high rates of assembly are in marked contrast to most traditional, automated assembly operations that only achieve rates on the order of 150 feet per minute or so.

Figure 22:
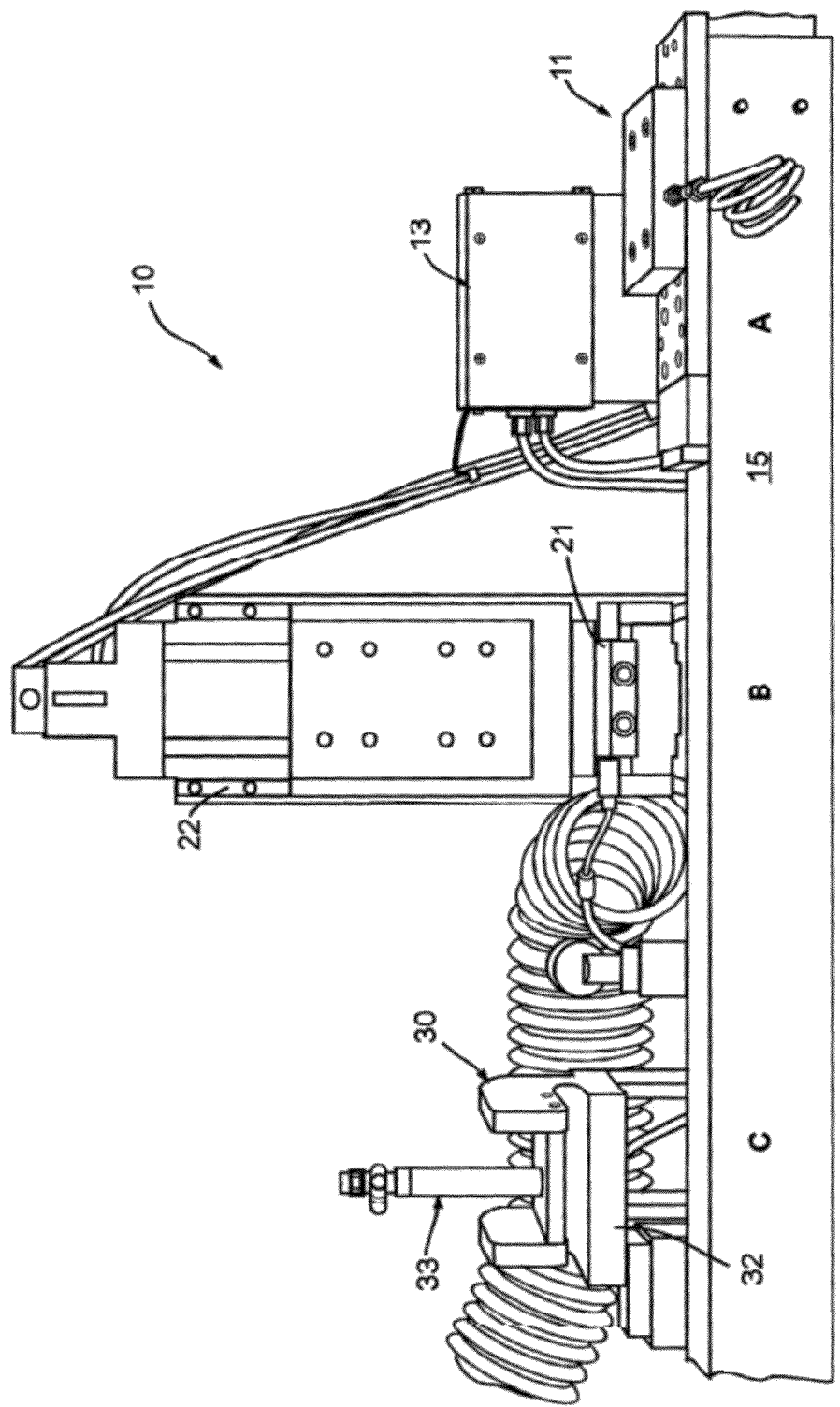
FIG. 22 is a picture of an assembly apparatus employing an activator means in accordance with the present invention.

While any of the activator face configurations shown in FIGS. 3 through 21 are efficacious, the efficacy varies, especially when employed in activating an encapsulated curable adhesive composition. In order to evaluate relative efficacies of various activator faces, a test workstation 10, mimicking an in-line, high speed bonding apparatus, was constructed as shown in FIG. 22. This apparatus consisted of four workstations: the Loading Station A, the Activation Station B, the Mating Station C and an End Station (not shown). A work sled 11 carried a 5 inch by 3.5 inch paperboard test card along rail 15 through each workstation. The test card had a 0.5 inch wide, 4 inch long, 18 mil thick band of pre-applied encapsulated adhesive made in accordance with the teaching of Schwantes et. al. applied along its centerline beginning at its forward edge and ending approximately 1 inch from the tail end of the card. The adhesive was manually applied to the cards using a coating block.

Figure 23:
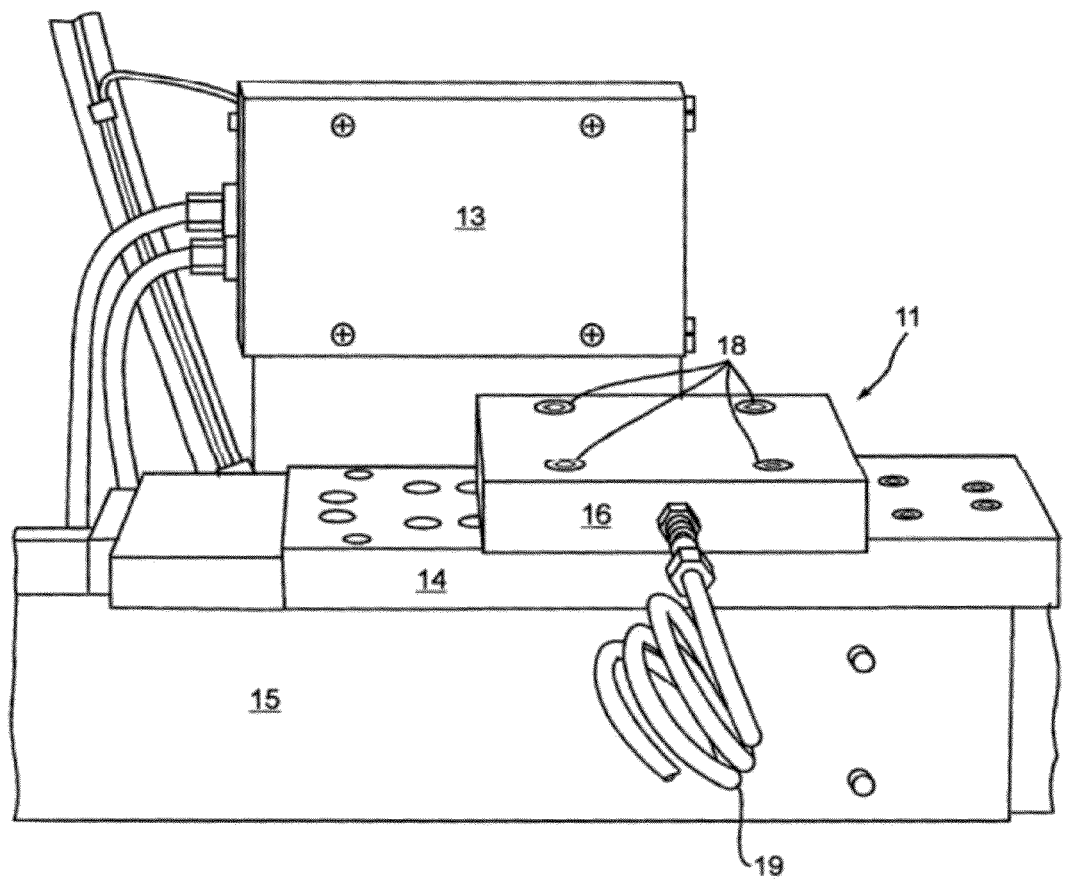
FIG. 23 is a picture of the sled means of the assembly apparatus of FIG. 22.

As more clearly shown in FIG. 23, the work sled 11 comprises a base 14 and a platform 16. Integrated into the platform 16 were four vacuum ports 18 attached to a vacuum means (not shown) through conduit 19. During testing, at Loading Station A, the card would be centered on the platform 16, adhesive side up, and the vacuum applied to hold the card in place. The vacuum was maintained until the bonded card came to a rest in the End Station. Loading Station A also incorporated a laser sensor means 13 for detecting the height of the surface of the card which communicated with a motorized or, preferably, a hydraulically operated elevator means 22 in the Activation Station B. Attached to the elevator means 22 is activator means 21 having an activator face (not shown) attached to the underside of the activator means. The elevator means, responding to the data supplied by the laser sensor means 13, would adjust the height of the activator means, and thus the activator face, to ensure that the upper surface of the projections on the activator face would come into touch contact with the surface of the paperboard card to which the pre-applied adhesive had been applied.

During activation, the sled, and thus the test card, would traverse through the Activation Station at a rate of 250 feet per minute. The sled carrying the activated test card would then enter the Mating Station and stop whereupon mating means 30 would mate a second 5 inch by 3.5 inch paperboard card to the activated card. In this respect, mating means 30 includes a work platform 32 and vacuum ports (not shown) for holding the second card to the underside of the platform. During the mating step a piston 33 would lower the work platform 32 until the two cards mated with a pressure of approximately 5 psi. Thereafter the work platform was retracted and the work sled moved on to the End Station. The assembled test card structures were then removed from the sled and allowed to set. Subsequently, the assembled test card structures were evaluated for adhesive strength and, for the purpose of this application, microcapsule fracture. The latter was determined by solvent extraction on cards subjected to the activator means and others not so subjected in conjunction with gas chromatography of the extractions to determine the amount of liquid monomer released during the activation process versus the total amount of liquid monomer present in the pre-applied adhesive, except here the pre-applied adhesive was inactive, i.e., it lacked the curative ingredient, so that the released liquid would not cure.

Based on the microcapsule fracture evaluation, it was found that simple herringbone configurations, with and without splitter, as shown in FIGS. 3, 4 and 6, only succeeded in achieving rupture of around 25 to 30 percent of the microcapsules. On the other hand, the more complex activator faces of FIGS. 8, 9 and 12 having a plurality of different types of projections achieved much higher microcapsule fracture, generally on the order of from 50 to 60%, with the same composition. Based on these findings, other configurations, such as the crosshatch type activator faces of FIGS. 20 and 21 may provide good microcapsule rupture, particularly when combined with reciprocating motion. However, the crosshatch pattern of these activator faces will likely only result in the generation of what is essentially a thin film of activated adhesive.

Though the numerical values on the extent of microcapsule fracture noted above appear low, the efficiency of the activator means of the present invention are comparable with, and in most instances better than, those achieved with traditional activator means. Of course, varying the chemistry and make-up of the encapsulated adhesives will also affect the fracture efficiency. For example, it is anticipated that higher fracture performance may be realized with a microencapsulated liquid adhesive as opposed to the encapsulated solid and semi-solid carriers of Schwantes et. al. Furthermore, the activator means of the present invention have the added benefit of providing the requisite degree of kneading and mashing necessary for effectively employing the encapsulated materials of Schwantes et. al., which show reduced or poor performance absent multiple passes with traditional activator means. More importantly, the activator means of the present invention allow for the generation of beads of activated adhesive, rather than thin films, which greatly expand the applications into which pre-applied adhesive may be employed.

Activator means in accordance with the present invention were also evaluated on a modified, automated packaging line, one typical for the filling and closing of, for example, a cereal box, with the exception that the apparatus did not employ a hot melt dispensing station. Such apparatus are well known in the art and typically comprise a magazine for holding the carton blanks, a conveyor means for moving the carton blank along the production line, a feeding means for placing the carton blanks on the conveyor means, a forming means for squaring the carton blank, an adhesive dispensing means for applying a hot melt adhesive to the end flaps of the carton blank and closure means for closing the flaps and holding them in the close relation to allow the adhesive to cool and seal the carton. Here, however, instead of the adhesive dispenser, the apparatus incorporated two activator means in accordance with the present invention, one on each side of the conveyor means at a point subsequent to the squaring and/or filling operation and prior to the closing operation. Also, here the carton blanks had an encapsulated adhesive pre-applied to the inner surface of the outer end flaps. Although various techniques could be and were employed to apply the adhesive, in one series of tests the encapsulated adhesive was applied via flexographic printing using an anilox roll and a 0.25 inch thick flexographic plate which deposited the adhesive in a diamond pattern. As the carton blank passed the activator means—typically the apparatus was run as a line speed of about 150 feet per minute, though a 250 feet per minute speed was also attained—the features on the activator surface acted upon the pre-applied adhesive. As the carton blank continued, the closure means closed the end flaps and held the same in the closed position until the formed carton was expelled from the apparatus. The expelled cartons were sealed at each end, demonstrating the effectiveness of the activator means.

Although the present invention has been described with respect to specific embodiments and examples, it should be appreciated that other embodiments utilizing the concepts of the present invention are possible without departing from the scope of the invention. Thus present invention is defined by the claimed elements and any and all modifications, variations, or equivalents that fall within the spirit and scope of the underlying principles set forth herein.

We claim:

1. An apparatus adapted to activate a pre-applied adhesive or sealant composition on a substrate as said substrate continuously moves through said apparatus, said apparatus comprising:

a workstation for receiving a substrate having applied to a surface thereof a pre-applied adhesive composition, a conveyance means for continuously moving the substrate into and through said workstation, and an activator means associated with the workstation, said activator means comprising an activator body and at least one activator face attached to, integrated into or forming a part of a surface of the activator body, said activator face characterized as (i) having a centerline axis and, perpendicular thereto, a transverse axis, said centerline axis being parallel to and aligned with the direction of the movement of the substrate through the workstation and (ii) a plurality of projections extending from the surface thereof, which projections are (a) adapted to engage and mobilize the pre-applied adhesive on the substrate as the substrate passes through the workstation and (b) aligned in such a way as to deposit or leave the adhesive in an activated state in a predetermined pattern or configuration and at a predetermined location on the substrate as it exits the workstation; wherein during operation of the apparatus, the activator means and conveyance means are configured so that the projections of the activator means engage and mobilize the preapplied adhesive or sealant composition on the substrate as the substrate moves through the workstation.

2. The apparatus of claim 1 further comprising (a) adjustment means to adjust the relative position, with or without compressive force, of the activator face to the substrate upon which it is to act, (b) engagement means capable of moving the activator means between a first position where it will act upon a substrate as it passes through the workstation and a second position removed or retracted from the first position so as to prevent engagement between the activator means and the substrate, or (c) both (a) and (b).

3. The apparatus of claim 2 wherein the adjustment means is present and the apparatus further comprises a sensor device associated with the adjustment means which detects differences in the height of the substrate to be acted upon in the workstation and causes the adjustment means to properly position the activator face to maintain a set position relative to the substrate surface from one substrate to another.

4. The apparatus of claim 1 wherein the activator face incorporates or is in a heat transfer relationship with a heating means and is capable of transferring heat to the preapplied adhesive upon contact therewith.

5. The apparatus of claim 1 further comprising (a) vibrating means or (b) reciprocating or oscillating means for effecting reciprocating or oscillating movement to the activator means along the transverse axis or (c) both (a) and (b) as the substrate is moving past the activator means.

6. The apparatus of claim 1 wherein the projections are in a staggered relationship when viewed in the direction parallel to the centerline axis.

7. The apparatus of claim 6 wherein the projections or at least a majority of the projections effectively overlap when viewing the activator face along its surface in the direction parallel to the centerline axis.

8. The apparatus of claim 6 where less than all of the projections effectively overlap when viewing the activator face along its surface in the direction of the centerline axis thereby evidencing one or more linear unobstructed pathways across the surface of the activator face, said one or more pathways being between at least two projections and parallel to the centerline axis and the activator apparatus further comprises or has associated therewith reciprocating or oscillating means for effecting reciprocating or oscillating movement to the activator body along the transverse axis as the substrate is moving past the activator means wherein the extent of movement is at least one-half the width of the at least one unobstructed pathway.

9. The apparatus of claim 1 wherein the projections are selected from linear dams and ridges, chevrons, herringbones, inverted "V" shaped or crescent shaped dams or ridges, pyramids, hemispheres, hemispheroids, and cylinders and combinations thereof.

10. The apparatus of claim 1 wherein the projections include at least one linear projection or at least one projection having linear extensions posterior to one or more other substantially non-linear projections.

11. The apparatus of claim 10 wherein the substantially non-linear projections are selected from the group consisting of inverted crescents, small inverted "V"s, hemispheres, hemispheroids, pyramids and cylinders.

12. The apparatus of claim 1 wherein at least one of the projections is a linear projection or a projection having linear extensions or arms.

13. The apparatus of claim 12 wherein the linear projection or extension is set at an angle relative to the centerline axis, which angle is from about 20° to about 70°.

14. The apparatus of claim 1 having at least one linear projection and wherein the activator face further comprises at least one recess immediately forward of and running the length of one or more of the linear projections or at least a portion thereof.

15. The apparatus of claim 1 wherein the projections are aligned in a plurality of rows, each row parallel to the transverse axis and spaced along the centerline axis wherein at least some of the projections in one row are staggered relative to the projections in another row.

16. The apparatus of claim 1 wherein the activator face further includes one or more elements defining one or more channels posterior to the projections.

17. The apparatus of claim 16 wherein one or more of the elements defining the channels have anterior portions which also serve as projections lifting and directing the mobilized adhesive material into the channel.

18. The apparatus of claim 16 wherein the depth and width of the channel(s) are predetermined to extrude a bead(s) of activated adhesive of a desired width and height.

19. The apparatus of claim 1 wherein the projections are selected from the group consisting of linear projections, diversionary projections and splitters and combinations thereof.

20. The apparatus of claim 1 wherein at least one of the projections on the activator face is a linear projection perpendicular to the centerline axis and (a) all of said perpendicular linear projections are substantially shorter in length than the width of the pre-applied adhesive to be acted upon, (b) the apparatus further includes a reciprocating, oscillating, or vibration means for imparting reciprocating motion to the activator face along the transverse axis as the substrate is moving past the activator means, the extent of its movement being sufficient to allow preapplied adhesive buildup in front of the perpendicular linear projection(s) to pass one or both ends thereof as the substrate passes through the workstation, or (c) both (a) and (b).

21. The apparatus of claim 20 wherein the activator face has a plurality of linear projections substantially perpendicular to the centerline axis, wherein said linear projections are co-linear or staggered along, but not necessarily intersecting with, the centerline axis, or both.

22. The apparatus of claim 1 wherein the projections include at least one linear projection, a plurality of diversionary projections and at least one splitter.

23. The apparatus of claim 1 wherein at least one of the projections is a linear projection which is parallel to the centerline axis and the apparatus further includes a reciprocating, oscillating, or vibration means for imparting reciprocating motion to the activator face along the transverse axis as the substrate is moving past the activator means, the extent of such movement being sufficient to activate enough preapplied adhesive to achieve the desired bond width.

24. The apparatus of claim 1 wherein the activator face from which the projections extend is contoured across its transverse axis. the contour corresponding to the contour of the surface of the substrate upon which it is to act.

25. The apparatus of claim 1 wherein the activator face from which the projections extend is planar.

\* \* \* \* \*